(12) United States Patent
Nakaji et al.

(10) Patent No.: US 6,556,134 B2
(45) Date of Patent: Apr. 29, 2003

(54) DISPLAY APPARATUS AND METHOD FOR AUTOMOTIVE VEHICLE

(75) Inventors: Yoshiharu Nakaji, Yokohama (JP); Satoshi Kitazaki, Yokohama (JP); Kazuhito Kato, Yokohama (JP); Shunsuke Hijikata, Yokohama (JP); Akinari Hirao, Yokohama (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 09/987,260

(22) Filed: Nov. 14, 2001

(65) Prior Publication Data

US 2002/0075136 A1 Jun. 20, 2002

(30) Foreign Application Priority Data

Dec. 5, 2000 (JP) ........................................ 2000-370546

(51) Int. Cl.⁷ ................................................. G09F 9/00
(52) U.S. Cl. ..................... 340/461; 340/995; 340/425.5
(58) Field of Search ................................. 340/461, 995, 340/990, 438, 439, 425.5, 980, 815.4; 701/208, 211; 315/82; 345/102, 207; 349/61

(56) References Cited

U.S. PATENT DOCUMENTS

| | | | | |
|---|---|---|---|---|
| 5,214,413 A | * | 5/1993 | Okabayashi et al. | |
| 5,428,265 A | * | 6/1995 | Booth, Jr. et al. | 315/158 |
| 5,554,912 A | * | 9/1996 | Thayer et al. | 315/157 |
| 5,617,112 A | * | 4/1997 | Yoshida et al. | 345/102 |
| 5,673,987 A | * | 10/1997 | Futschik et al. | 362/23 |
| 5,796,350 A | * | 8/1998 | Fuse | 340/815.75 |
| 5,883,605 A | * | 3/1999 | Knapp | 345/7 |
| 6,483,245 B1 | * | 11/2002 | Weindorf et al. | 315/82 |

FOREIGN PATENT DOCUMENTS

| | | |
|---|---|---|
| JP | 9-210704 | 8/1997 |
| JP | 10-116052 | 5/1998 |
| JP | 11-184446 | 7/1999 |

OTHER PUBLICATIONS

Toyohiko Hatada, "Physiological Engineering (or Physiology Optics) 16" (theme—Natural View Image and Human's Sense of Vision Characteristic) pp. 121–130, No. 74, O plus E, Jan. 1986.

* cited by examiner

Primary Examiner—Brent A. Swarthout
(74) Attorney, Agent, or Firm—McDermott, Will & Emery

(57) ABSTRACT

In display apparatus and method for an automotive vehicle, a display (2) is disposed on a position of the vehicle placed in a proximity to a dashboard surface of the vehicle and a controller (7), when a state of the vehicle which satisfies a predetermined condition is detected, executes a process to gradually reduce a brightness of an image screen of the display toward a predetermined direction which is more distant from a direction of a line of sight of a vehicular driver when the vehicular driver gazes a vehicular forward direction. In one embodiment, the controller gradually reduces the brightness of the image screen of the display toward the predetermined direction in a linear manner. The predetermined direction is, for example, directed from an upper end of the image screen to a lower end thereof.

18 Claims, 24 Drawing Sheets

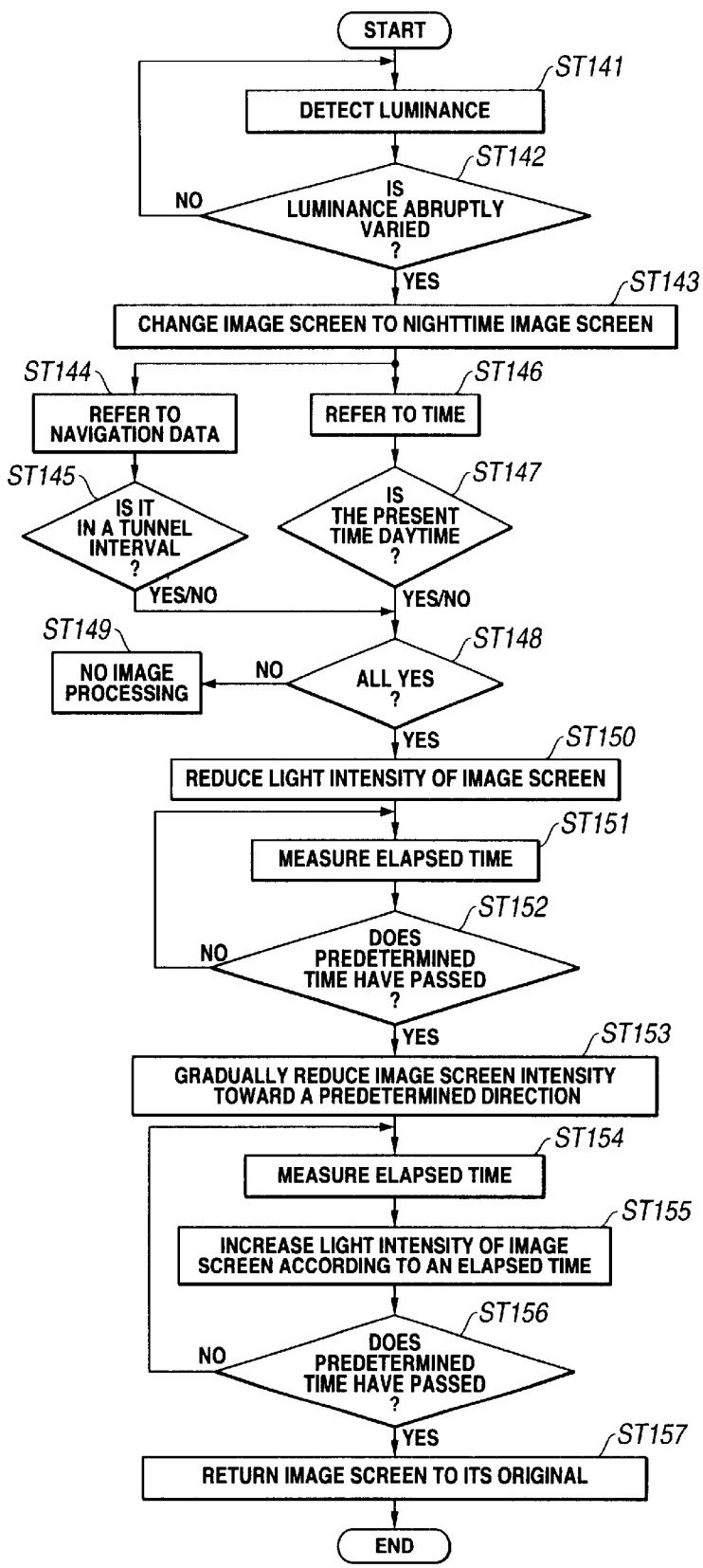

DISPLAY APPARATUS AND METHOD FOR AUTOMOTIVE VEHICLE

BACKGROUND OF THE INVENTION

1. Field of the Invention

The present invention relates to display apparatus and method for an automotive vehicle which display road map information and various kinds of vehicular information on an image screen of a display thereof.

2. Description of the Related Art

Each of three Japanese Patent Application First Publications No. Heisei 11-184446 published on Jul. 9, 1999 (hereinafter, referred to as a first Japanese Patent Application Publication), No. Heisei 9-210704 published on Aug. 15, 1997 (hereinafter, referred to as a second Japanese Patent Application Publication), and No. Heisei 10-116052 published on May 6, 1998 (hereinafter, referred to as a third Japanese Patent Application Publication) exemplifies a previously proposed vehicular display apparatus.

In a first previously proposed vehicular display apparatus disclosed in the first Japanese Patent Application Publication, a brightness level of the whole image screen is adjusted in accordance with a present time and a vehicular running position (of place). The brightness level of the display image apparatus is modified on the basis of such a vehicular running environment information as a vehicular run under a sunshine area or a vehicular run in a tunnel.

In a second previously proposed vehicular display apparatus disclosed in the second Japanese Patent Application Publication, when a particular traffic information is obtained, the brightness of the displayed image screen is controlled in accordance with an illumination state of the vehicle. The vehicular driver can accurately recognize a necessary information from the displayed image screen without mistake.

In a third previously proposed vehicular display apparatus disclosed in the third Japanese Patent Application Publication, after a field of view environment image of an observer is generated and a point of fixation on its image is specified, an adaptability of a sense of vision of the observer is calculated. Furthermore, the display state of the display image screen is set on the basis of the calculated adaptability.

SUMMARY OF THE INVENTION

However, although, in the first previously proposed vehicular display apparatus, the brightness level on the displayed image screen is adjusted in accordance with the vehicular (surrounding) environment, no consideration on a vehicular driver's adaptability to the brightness of the image screen is given when, for example, the vehicle has entered the tunnel.

In addition, although, in the second previously proposed vehicular display apparatus, the brightness of the displayed image screen is adjusted only when the particular traffic information is displayed, no consideration on the vehicular driver's adaptability to a dark environment at an earlier time is taken.

Furthermore, although, in the third previously proposed vehicular display apparatus, the brightness of the displayed image screen is adjusted, with the adaptability of the observer to be adapted to the vehicular surrounding environment taken into account, no description on an instantaneous adaptability of the vehicular driver to the dark environment is made.

In a case where the vehicle has entered the tunnel in a daytime of a fine weather, almost all of abilities of the sense of vision of the driver may be considered to be concentrated onto a vehicular drive. Suppose that if some information on the displayed image screen of the vehicular display apparatus is out of a field of view region in which the information can be read in a short time or if the information quantity is in excess of a quantity that can be read in a short time. In that case, it maybe considered that it is not easy for the vehicular driver to read the information on the displayed image screen That is to say, suppose, for example, that a technique described in the third Japanese Patent Application Publication is applied to such a case when the display is extended at a position of the vehicle or to a dimension which is in excess of the field of view region within which the vehicular driver can read the information in a short time. This case would merely result in a useless stimulation of the sense of vision of the vehicular driver. In addition, an effect of the application of the technique disclosed in the third Japanese Patent Application Publication on a purpose for the vehicular driver to be adapted to a dark environment is lowered.

It is, hence, an object of the present invention, to provide display apparatus and method for an automotive vehicle which are capable of modifying the image screen display with an importance placed on the vehicular driver's adaptability when a vehicular environment is changed.

According to one aspect of the present invention, there is provided a display apparatus for an automotive vehicle, comprising: a display disposed on a position of the vehicle placed in a proximity to a dashboard surface of the vehicle; and a controller, in response to a detection of a state of the vehicle which satisfies a predetermined condition, to carry out a process to gradually reduce a brightness of an image screen of the display toward a predetermined direction which is more distant from a direction of a line of sight of a vehicular driver when the vehicular driver gazes a vehicular forward direction.

According to another aspect of the present invention, there is provided a display method for an automotive vehicle, comprising: providing a display disposed on a position of the vehicle placed in a proximity to a dashboard surface of the vehicle; detecting a state of the vehicle which satisfies a predetermined condition; and gradually reducing a brightness of an image screen of the display toward a predetermined direction which is more distant from a direction of a line of sight of a vehicular driver when the vehicular driver gazes a vehicular forward direction.

This summary of the invention does not necessarily describe all necessary features so that the invention may also be a sub-combination of these described features.

BRIEF DESCRIPTION OF THE DRAWINGS

FIG. 31 is an operational flowchart representing a procedure executed in the eighth preferred embodiment of the vehicular display apparatus.

DETAILED DESCRIPTION OF THE PREFERRED EMBODIMENTS:

Reference will hereinafter be made to the drawings in order to facilitate a better understanding of the present invention.

(First Embodiment)

Figure 1:
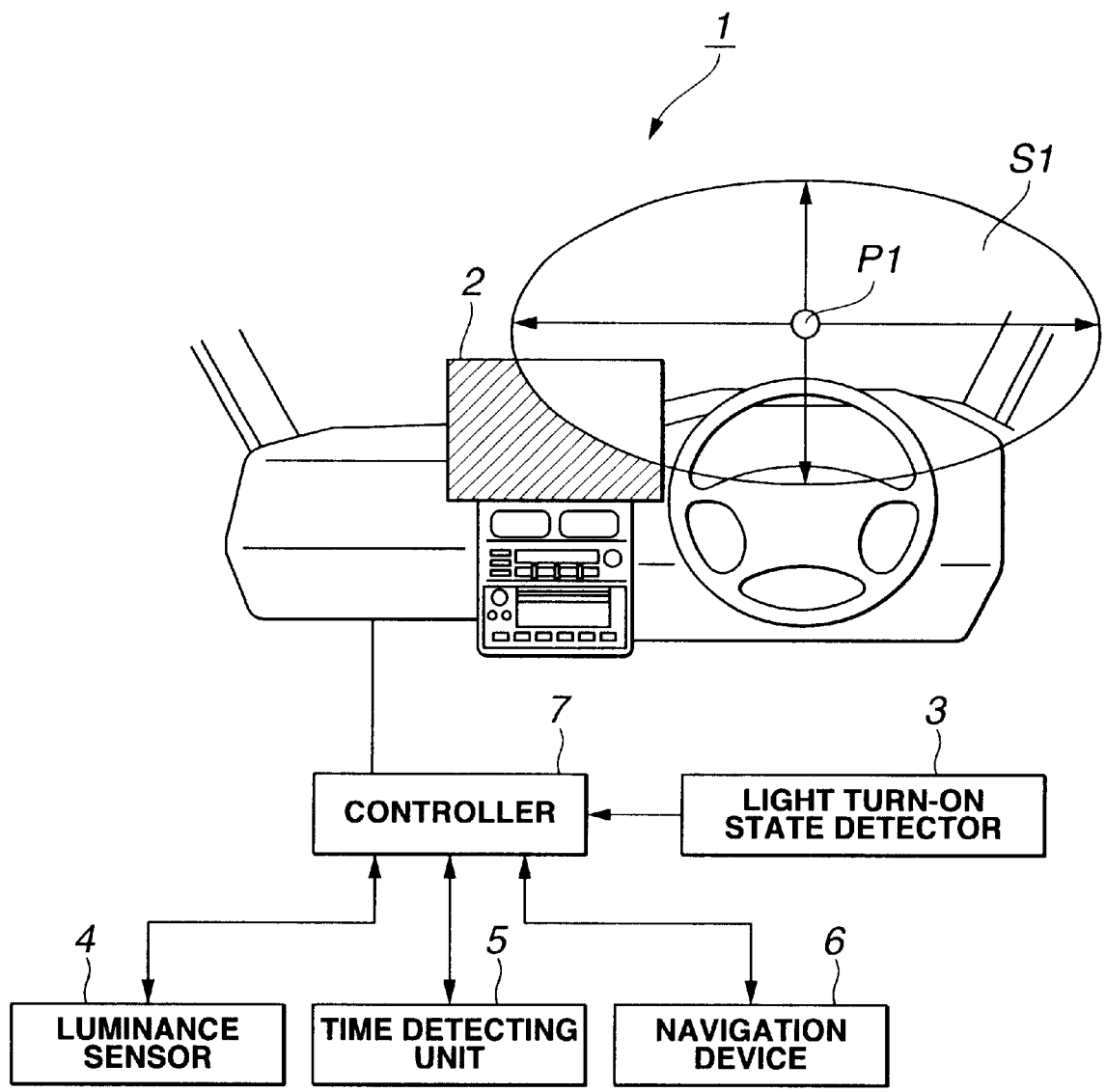
FIG. 1 is a schematic block diagram of a display apparatus for an automotive vehicle (hereinafter, also referred to as a vehicular display apparatus) in a first preferred embodiment according to the present invention applicable to each of second, third, fourth, fifth, sixth, seventh, and eighth preferred embodiments.

FIG. 1 shows a block diagram representing a structure of a vehicular display apparatus in a first preferred embodiment according to the present invention. It is noted that the block diagram shown in FIG. 1 is applicable to each of second, third, fourth, fifth, sixth, seventh, and eighth preferred embodiments according to the present invention.

As shown in FIG. 1, a whole vehicular display apparatus denoted by 1 includes: a display (image display means) 2 displaying various types of information related to a road map or vehicle; a light turn-on state detector 3 to detect whether the vehicle is in a light turn on state (illumination state); a luminance sensor 4 to detect an illumination intensity (or brightness) surrounding the vehicle; a time detecting unit 5 to detect the present time from a clock circuit mounted in the vehicle: a navigation device 6 to mainly calculate the present position of the vehicle; and a controller 7 to control an image screen displayed on display 2 on the basis of each of pieces of information from these sensor, detector, and device. It is noted that controller 7 generally includes a microcomputer and its peripheral circuits. The microcomputer constituting controller 7 generally includes: a CPU (Central Processing Unit), a RAM (Random Access Memory), a ROM (Read Only Memory), Input-and-Output Port, a common bus, and so forth.

In addition, a reference sign P1 shown in FIG. 1 denotes a direction of a line of sight of a vehicular driver when the vehicular driver gazes a vehicular forward direction. An elliptical region S1 drawn with the direction of the line of sight P as a center represents a field of view region which can visually be recognized only by movements of eyeballs of the vehicular driver (this is, so-called, a stable eye-concentration field of view) when the vehicular driver gazes the vehicular forward direction.

Figure 2:
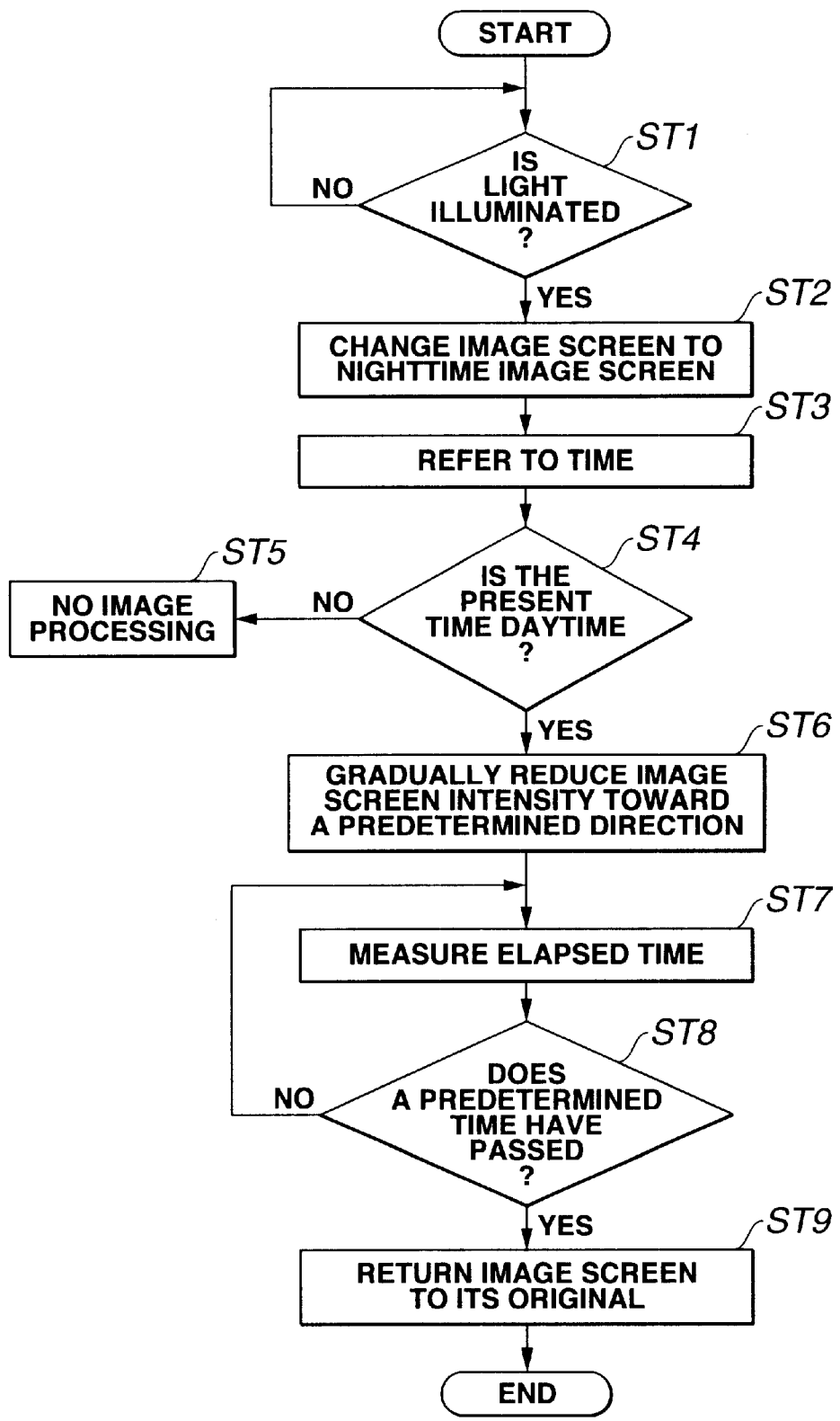
FIG. 2 is an operational flowchart representing a procedure executed in the vehicular display apparatus in the first preferred embodiments.

Next, an operation of the vehicular display apparatus in the first preferred embodiment will be described with reference to a flowchart shown in FIG. 2. First, when a vehicular ignition switch is turned on, the routine shown in FIG. 2 is started. Controller 7 determines from light turn-on state detector 3 whether a vehicular light device (headlights and/or small lights) is turned from an OFF state to an ON state (illuminated) at a step ST1.

Then, if Yes at step ST1, viz., the vehicular light device is turned on (illuminated), controller 7 changes the displayed image screen of display 2 to a nighttime purpose image screen (an image screen for a nighttime purpose and the nighttime (purpose) image screen means the image screen whose brightness (light intensity) is slightly reduced than a normal daytime image screen) from the daytime image screen at a step ST2.

Next, data on the present time and present date are detected from time detecting unit 5 at a step ST3.

At the next step ST4, controller 7 determines whether the present time is in a daytime. If it is not in the daytime (No at step ST4), no image processing on display 2 is carried out at a step ST5.

Figure 3:
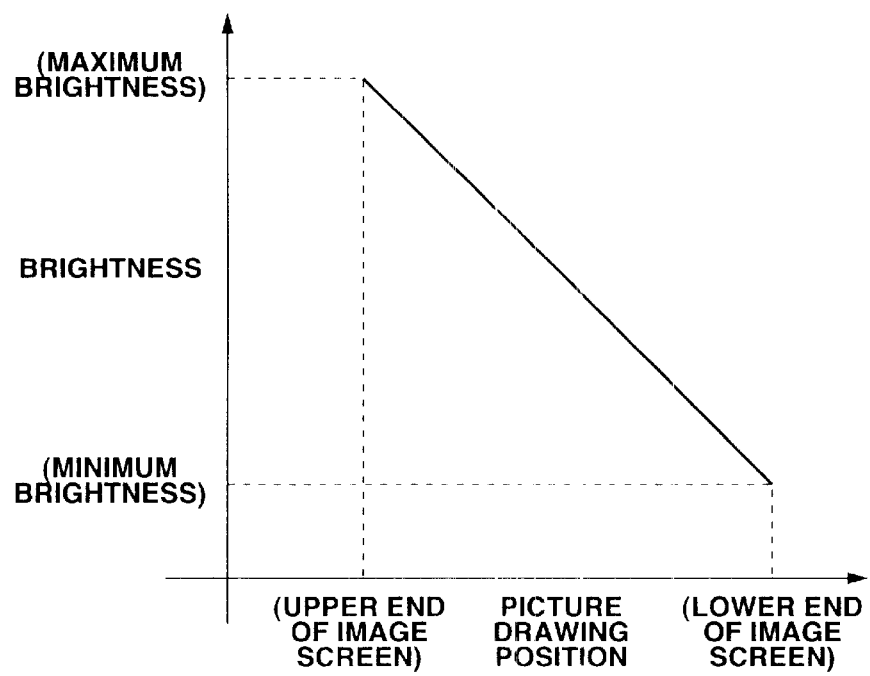
FIG. 3 is a characteristic graph representing a relationship between an image screen position and a variation in a brightness of an image screen of a display in the vehicular display apparatus in the first preferred embodiment according to the present invention.

On the other hand, if the present time is in the daytime (Yes at a step ST4), controller 7 adds an image processing for a brightness of the image screen directed from an upper direction to a lower direction for the image screen brightness to be gradually reduced at a step ST6 in a linear manner, as shown in a characteristic graph of FIG. 3. At step ST6, a maximum brightness of the image screen of display 2 is set to correspond to that the nighttime image screen originally has. In addition, in such a display method as described above, a gross quantity of the luminous intensity (brightness) of the whole image screen is reduced and an effect of promoting an adaptation of a human's sense of vision to a dark field of view environment is provided. Hence, apart of the image screen may temporarily and slightly be brighter than the brightness that the nighttime image screen originally has. In this respect, the same matter may be applied to each of the second through eighth preferred embodiments as will be described later.

Figure 4:
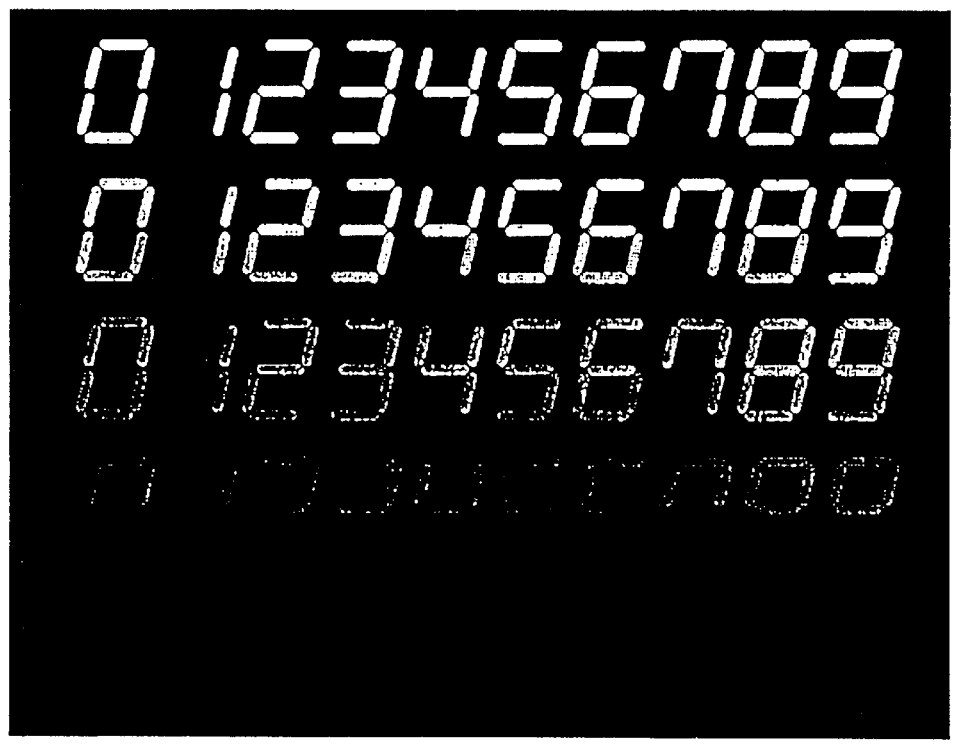
FIG. 4 is an explanatory view of a display example in the case of the first preferred embodiment of the vehicular display apparatus shown in FIG. 1.

FIG. 4 shows an explanatory view representing a display example of the image screen of display 2.

As shown in FIG. 4, the information is displayed on the image screen in a manner for the image screen brightness to be gradually reduced as the part of the image screen of the display 2 is advanced from an upper side of the image screen to a lower side thereof. That is to say, by lowering the intensity of the lower side image screen, a gross quantity of the brightness of the whole image screen can be reduced. In addition, the sense of vision (also called, visual sense) of the vehicular driver can be avoided from being uselessly stimulated. Consequently, the adaptation of the visual sense of the vehicular driver to the dark field of view environment can be promoted.

While, since the brightness of the upper side of the image screen of display 2 is not reduced as shown in FIG. 4, an important information such as a vehicular velocity which is still needed to be displayed on display 2 even under a situation such a vehicular entrance of the tunnel in the daytime that a relatively much attention is required can be continued to be displayed on a part of the image screen of display 2 which is relatively near to the line of sight of the vehicular driver when the vehicular gazes the vehicular forward direction.

In addition, since the brightness of the image screen is varied linearly, a calculation quantity required for the brightness (intensity) variation to be processed in controller 7 can be reduced. It is noted that the above-described brightness variation process is not carried out when the present time is not in the daytime.

Referring back to FIG. 2, after the process of gradually reducing the intensity (brightness) of image screen at step ST6, controller 7 measures sequentially an elapsed time (step ST7). After a predetermined time has elapsed (Yes at step ST8), the intensity of image screen of display 2 is returned to that for of the original nighttime image screen at a step ST9. Then, the present routine is ended.

Herein, a characteristic of the human's sense of vision will be explained in order to facilitate an understanding of both of a field of view region within which the information can be read in a short time and another field of view region within which the visual sense of the vehicular driver is stimulated. According to an article called "Physiological Engineering (Optics) 16" on a January issue in 1986 of a magazine called O Plus E, a region, viz., "an effective field of view" in which an information search is possible only by eyeballs movement without the human's head motion is each 15° in leftward and rightward directions, about 12° in a lower direction, and about 8° in an upper direction. A region, viz., "a stable gaze field of view region" in which, with the human's head motion (generally, a head swing) added, a gaze motion can be carried out under a stable state is 30° through 45° in each of the leftward and rightward directions, 25° through 40° in the lower direction, and 20° through 30° in the upper direction with a point of fixation as a center.

Thus, in an "induced field of view" (the presence of the visual information and there is only a capability of a rough content of information and a minimum region when the eyeballs movement is forced to gaze the visual information with the head motion fixed (about 50° in each of the leftward and rightward directions and about 45° in each of the leftward and rightward directions, and about 45° in the lower direction, and about 40° in the upper direction with the point of fixation as the center) over a range wider than the stable gaze field of view region, a presence of a visual information, viz., the presence of light is recognized. Next, "a surround of a comparison field over a range (called, an auxiliary field of view)" provides further wider field of view than the induced field of view (viz., 100° through 200° in a horizontal direction and 85° through 130° in a vertical direction with the point of fixation as the center), an abrupt stimulus-response variation causes the gaze (watch) motion to be induced. That is to say, when the brightness is abruptly varied, this can be recognized.

Reading the information in a short time may be considered to be the following two operations. One concept is an operation to transfer the line of sight, viz., the point of fixation onto the display to search for the information only by the eyeballs movement. This operation range is a field of view region called the effective field of view and ranges about 20° in each of the upper and lower directions and about 30° in each of the leftward and rightward directions. Another concept is an operation is an operation to search for the information in a range in which the gaze motion can be carried out under the stable state with the head motion added. This range is the field of view region called a stable gaze field of view having the range of 45° through 70° in each of the upper and lower directions and of 60° through 90° in each of the leftward and rightward directions.

Suppose such an operation that the information on a display device is searched, with the head motion added, in a range such that the gaze (watch) motion can stably be carried out at an aimed timing at which it seems for the driver to be safe even when the driver turns the line of sight (the vehicular driver's eyes) from the vehicular forward direction for a while under a state in which the vehicular driver s eyes (line of sight) is directed toward the vehicular forward direction for a safety drive purpose during the drive of the vehicle. In this case, an inside of the stable watch (gaze) field of view, with the visual line when the vehicular driver gazes the vehicular forward direction as a reference, viz., an inside of an elliptical zone denoted by S1 shown in FIG. 1 is a region of the field of view in which the information can be read in a short time. Then, a range which is an outside of this field of view region (S1 in FIG. 1) is resulted in another field of view region in which the driver's sense of vision is stimulated without contribution to the reading the information On the other hand, suppose such an operation that the line of sight of the vehicular driver is moved into a center of the display device and the information is searched only through the eyeballs movement at the aimed timing at which it seems for the vehicular driver to be safe even if the line of sight of the driver is deviated for a while from the vehicular forward direction with the driver's head directed toward the direction in which the display device is present and the line of sight kept at the vehicular forward direction. In this case, if the screen of the display device has a size of such a range enough for the information to be searched only through the eyeballs movement, it may be considered to be reasonable to display an important information using the whole image screen.

Figure 5:
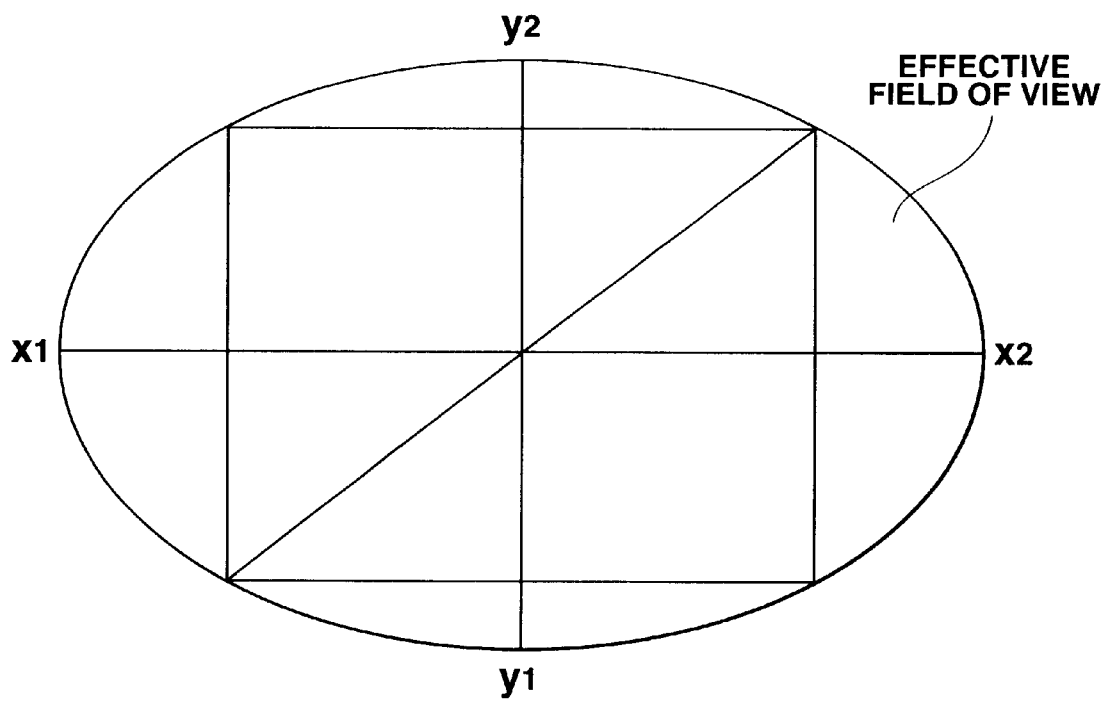
FIG. 5 is an explanatory view representing an effective field of view region and a size (dimension) of the image screen of the display.

Next, suppose a size of the field of view region in which the displayed information can be read in a short time, namely, the size of the display device which does not exceed the effective field of view. Many display devices such as a liquid crystal display (LCD), a CRT (Cathode Ray Tube) and so forth are of rectangular shapes so as to be suitable for televisions and computer system display devices. Hence, if the effective field of view is represented by an ellipse shown in FIG. 5, the size of the display device which does not exceed the effective field of view means a rectangle inscribed in the ellipse. That is to say, a line segment x1–x2 shown in FIG. 5 corresponds to a viewing angle of 30° in each of leftward and rightward directions with respect to a line segment directed from a position of the vehicular driver's eyes to a center portion of display 2 and a line segment y1–y2 corresponds to a viewing angle of 20° in each of upper and lower directions with respect thereto.

If a visual sense field is constant, each line segment x1–x2 and y1–y2 becomes shorter as a visual distance becomes shorter. Suppose that a vehicular driver's seat in an ordinary automotive vehicle is slid to a front seat end position using a seat slide mechanism, namely, suppose a case where, for example, a small female driver slides the driver's seat to accommodate herself to, so-called, a steering wheel position and a pedal position. In this case, the visual distance often indicates approximately 600 millimeters (mm).

In the case of the visual distance of approximately 600 millimeters (mm), a length of the line segment y1–y2 indicates approximately 212 millimeters (mm). Although a ratio of a lateral (long) side to a longitudinal (short) side of a rectangle inscribed in an ellipse defined by the line segments x1–x2 and y1–y2 is 4:3, a length of a diagonal line of the rectangle indicates approximately 265 millimeters (mm). The ratio of the long side to the short side corresponds to the size of image screen of the ordinary television or the computer system display device (so-called, an aspect ratio). Since the size of the image screen is usually indicated by the diagonal line in a unit of inch. A value of 10.4 which is converted fro 265 mm to the unit of inch is the size of the display device which does not exceed the field of view region in which the displayed information can be read in a short time.

Then, each preferred embodiment of the vehicular display apparatus according to the present invention has many disadvantages to such a relatively large-sized display that the image screen thereof is extended to a region exceeding the above-described viewing angles rather than such a relatively small-sized display that the image screen thereof is extended within the above-described viewing angles.

In the first embodiment, when a predetermined condition such that a vehicle state enters a tunnel in the daytime of a fine weather is detected, the brightness (luminous intensity) of the image display device (image display means) is controlled to be gradually reduced toward a predetermined direction which is set to be more distant from a direction of the line of sight of the vehicular driver when the vehicular driver gazes the vehicular forward direction. Therefore, a necessary information with an appropriate brightness is displayed at a position which is placed in a proximity to the driver's line of sight when the vehicular driver gazes the vehicular forward direction, viz., at a position on display 2 at which the line of sight can be avoided without an effort and the information can be read, Whereas, at such an image screen position that the information cannot be read unless the line of sight is largely moved, the brightness is reduced. Consequently, an appropriate display on the image screen such as to promote the adaptability of the driver's sense of vision can be achieved without useless stimulation to a view of the vehicular driver.

In addition, in the first preferred embodiment, as far as the size of the displayed screen of display 2 is concerned, the display image screen is extended up to a range of about 20° or more in each of the upper and lower directions and of about 30° or more in each of the leftward and rightward directions with a line segment directed from the vehicular driver's eyes position toward the center of the display as the center. Hence, it is not necessary to darken meaninglessly the displayed image screen having a width such that the information can be read in a short time. On the other hand, such an appropriate display can be achieved as to promote the adaptability of the sense of vision for such a relatively large image screen so as to be extended up to the field of view region which does not contribute to the read of the information in a short time but affects the adaptability of the sense of vision.

In addition, in the first preferred embodiment, the method of gradually reducing the brightness of the image screen is to reduce the brightness in the linear manner. Hence, such a load imposed on the vehicular display apparatus as to implement the image processing can be reduced.

Furthermore, in the first preferred embodiment, the predetermined direction described above is directed from an upper end of the image screen to a lower end thereof. Hence, the load of vehicular display apparatus 1 onto an implementation of the image processing can be reduced.

(Second Embodiment)

Next, the second preferred embodiment of the vehicular display apparatus according to the present invention will be described below.

The vehicular display apparatus in the second preferred embodiment has the same structure as that shown in FIG. 1. It is noted that, in the second embodiment, navigation device 6 is not always needed.

Figure 6:
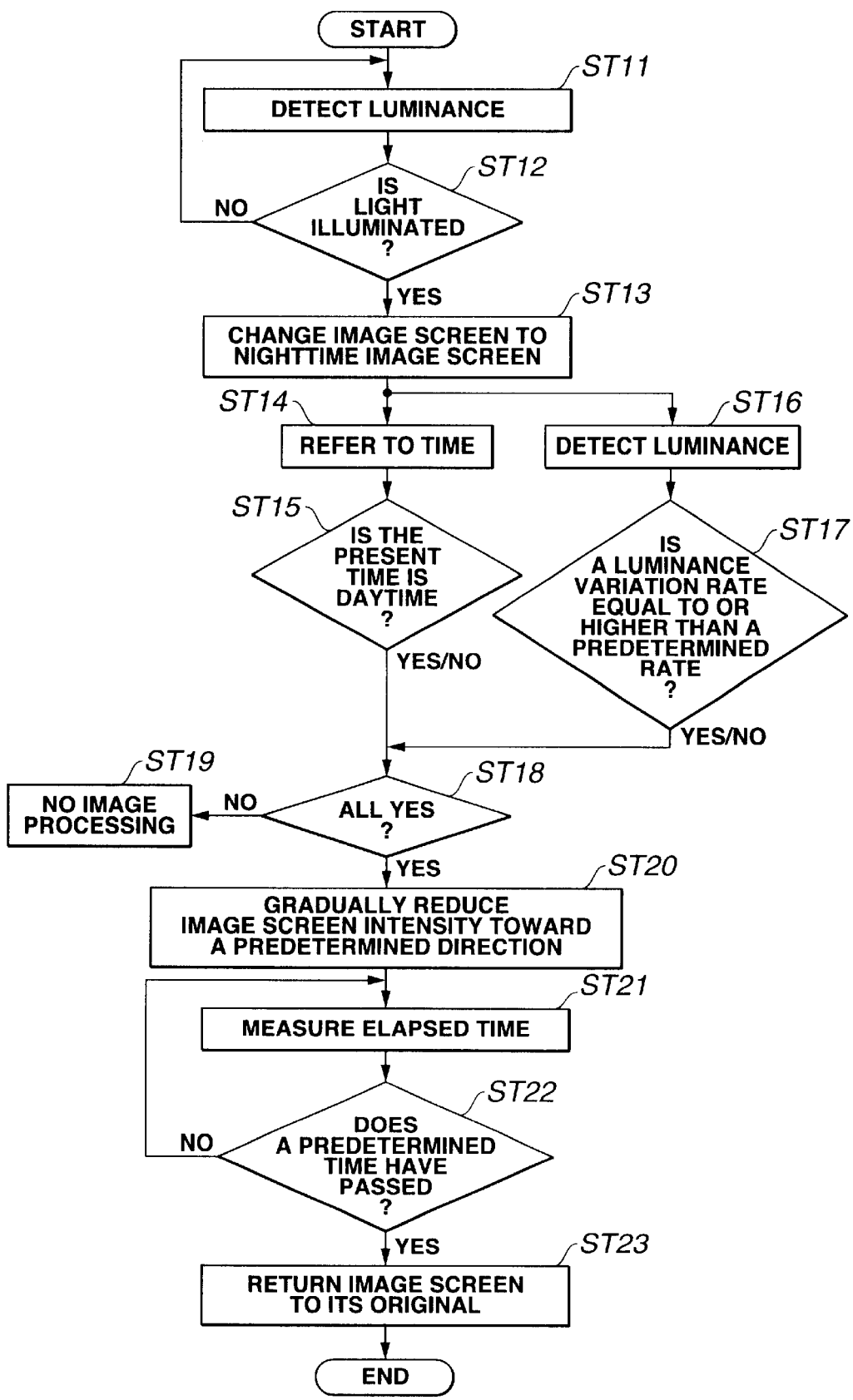
FIG. 6 is an operational flowchart representing a procedure executed in the vehicular display apparatus in the second preferred embodiment.

An operation of the second embodiment will be described with reference to a flowchart shown in FIG. 6. When the vehicular ignition switch is turned on, the routine of FIG. 6 is started. Controller 7 detects the luminance surrounding the vehicle from luminance sensor 4 at a step ST11. Then, for example, if the vehicle has entered the tunnel in the daytime and controller 7 detects that the vehicular light device (headlights and/or small lights) is turned on (illuminated) (Yes at a step ST12, display 2 is changed to the nighttime image screen at a step ST13.

Next, the routine goes to a step ST14. At step ST14, controller 6 reads data on the present time and date detected by time detecting unit 5 and determines if the present time is in the daytime (at a step ST15). At the same time, the routine goes from step ST13 to step ST14 and luminance sensor 4 detects the luminance surrounding the vehicle.

At a step ST17, controller 7 determines whether an luminance variation rate is equal to or larger than a predetermined value.

Figure 7:
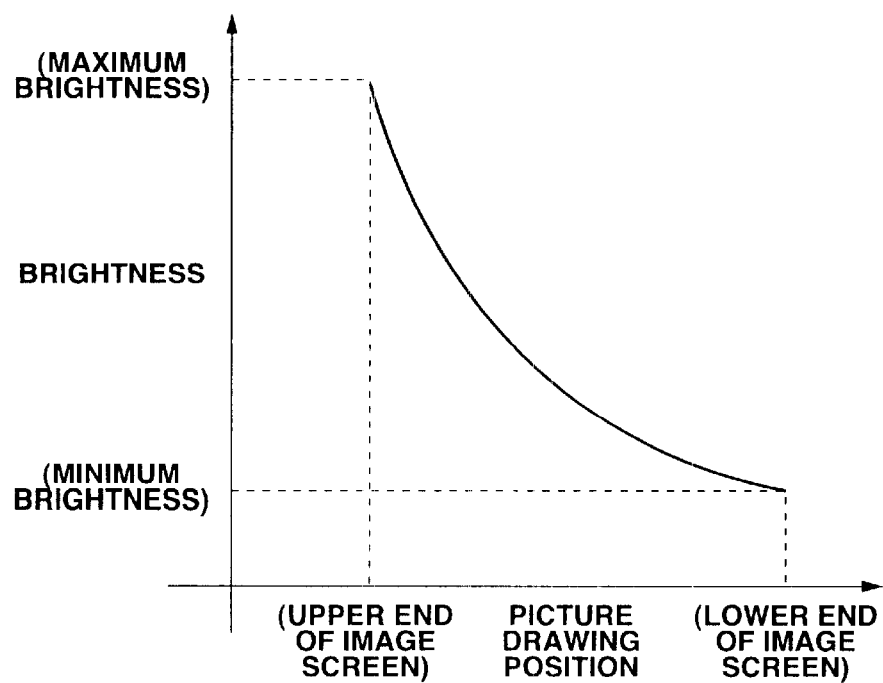
FIG. 7 is a characteristic graph representing the image screen position and the variation in the image screen brightness in the second preferred embodiment of the vehicular display apparatus.
Figure 8:
FIG. 8 is an explanatory view of a display example in the case of the second preferred embodiment of the vehicular display apparatus.

The routine goes from steps ST15 and ST17 to a step ST18. If the present time is in the daytime and the luminance variation rate is equal to or larger than a predetermined value (Yes at step ST18, viz., all yes), controller 7 determines that the present time is in the daytime and the vehicle has entered the tunnel and the routine goes to a step ST20. At step ST20, controller 7 determines that the vehicle has entered the tunnel in the daytime of fine weather and carries out a process of gradually reducing the image screen intensity (brightness) toward a predetermined direction, As shown in a characteristic graph of FIG. 7, the brightness (luminous intensity) of image screen is gradually reduced in an exponential function manner from an upper side of the screen of display 2 to a lower side of the screen of display 2. Therefore, as shown in FIG. 8, display 2 displays the image on the screen in which the upper side of the screen has a high intensity but the lower side thereof has an extremely low intensity such that the image is almost invisible. That is to say, the gross quantity of the brightness of the whole image screen is reduced by reducing the brightness at an upper side of the image screen and the useless stimulation of the driver's sense of vision can be avoided. Consequently, the adaptation of the sense of vision to the dark field of view environment can be promoted.

On the other hand, since the brightness of the upper side of the image screen of display 2 is not reduced (remain unchanged), the information on the vehicular velocity or so on that is still needed to be displayed even under such a situation that a relatively much attention is required, viz., that the vehicle has entered the tunnel can be continued to be displayed at a position (in this embodiment, the upper side) of the screen of display 2 which is relatively near to the line of sight when the driver gazes the vehicular forward direction. Furthermore, since the image screen intensity (or brightness) of display 2 is varied in the exponential function manner, a wider range of the image screen is darkened, maintaining such a minimum brightness that is visible at minimum in a case where a vehicular passenger other than the vehicular driver views the image screen of display 2.

Hence, the useless stimulation to the driver's sense of vision can be avoided.

Then, after the process of gradually reducing the intensity of the image screen is carried out at step ST20, controller 7 measures sequentially the elapsed time at a step ST21 of FIG. 6.

If the predetermined time has elapsed (Yes at a step ST21), a process of returning the luminous intensity of the image screen of display 2 to the original nighttime screen is carried out at a step ST23. It is noted that if the present time is not in the daytime or if the luminance variation rate is not equal to or larger than the predetermined value (No at step ST18), the routine goes to a step ST19 at which no image processing is carried out.

In the second embodiment, the method of gradually reducing the brightness of the image screen in the exponential function manner. Hence, the displayed image screen can provide a display characteristic which can appropriately be accommodated to the human's visual characteristic.

(Third Embodiment)

Next, the third preferred embodiment of the vehicular display apparatus will be described below. The vehicular display apparatus in the third preferred embodiment has the same structure as the first embodiment shown in FIG. 1. It is noted that, in the third embodiment, luminance sensor 4 is not always needed.

An operation of the vehicular display apparatus in the third preferred embodiment according to the present invention will be described with reference to a flowchart shown in FIG. 9.

Figure 9:
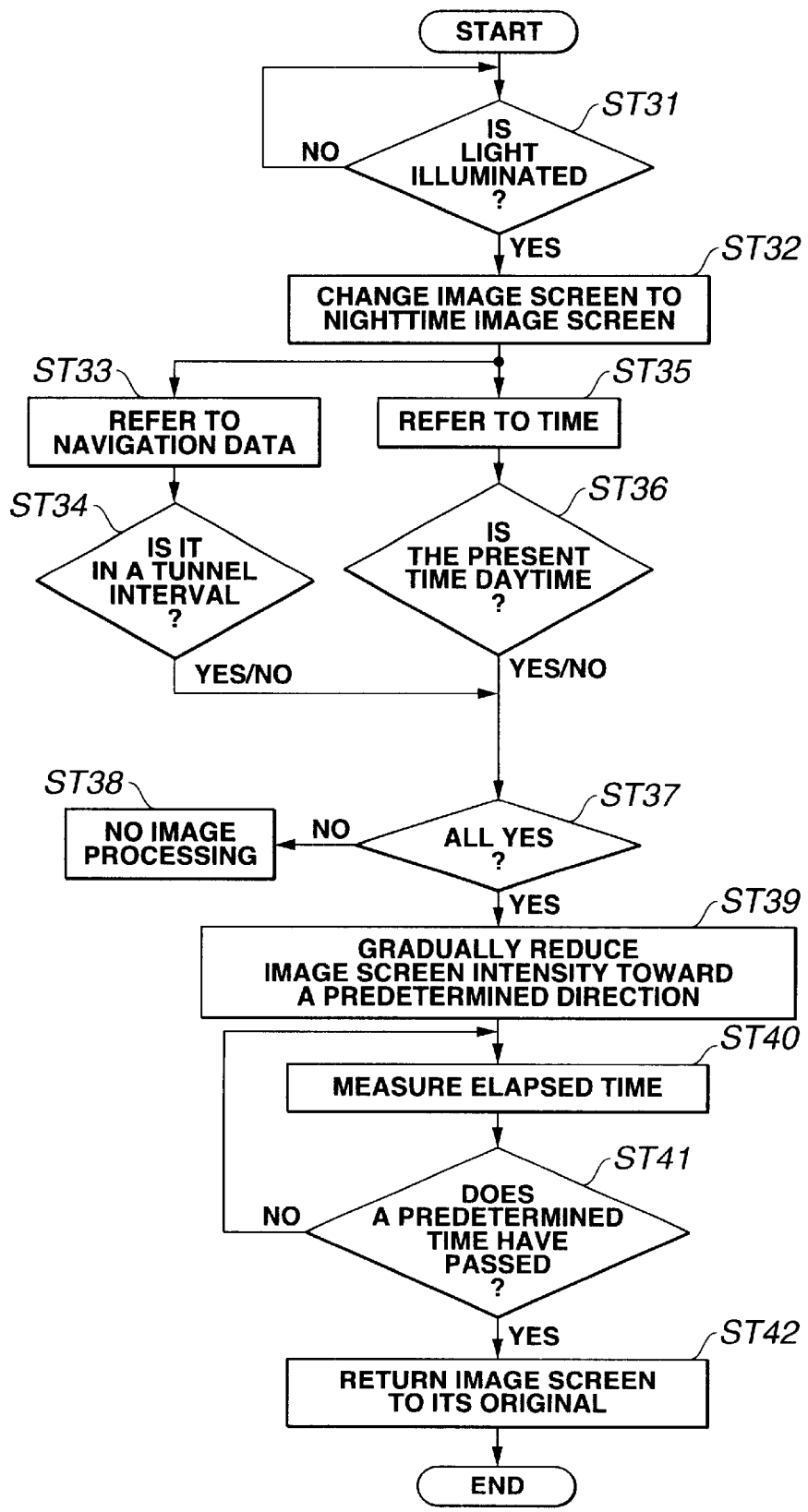
FIG. 9 is an operational flowchart representing a procedure executed in the vehicular display apparatus in the third preferred embodiment.

When the vehicular ignition switch is turned on, the routine shown in FIG. 9 is started. At a step ST31, controller 7 determines whether the light device (the headlights and/or small lights) is turned on (illuminated). If the vehicular light device is turned on (Yes at a step ST3, display 2 is changed to the nighttime (purpose) image screen (a step ST32).

Next, at the next step ST35, controller 7 reads data on the present time and date detected by time detecting unit 5. At the next step ST36, controller 7 determines whether the present time is in the daytime. At the next step ST33, controller 7 refers to road map data from navigation device 6 and determines whether the present running point of place is in a tunnel interval at a step ST34. If the present time is in the daytime and the vehicle is in the tunnel interval (Yes at a step ST37, viz., all yes), the image screen intensity (brightness) of display 2 is gradually reduced toward the predetermined direction at the next step ST39.

Figure 10:
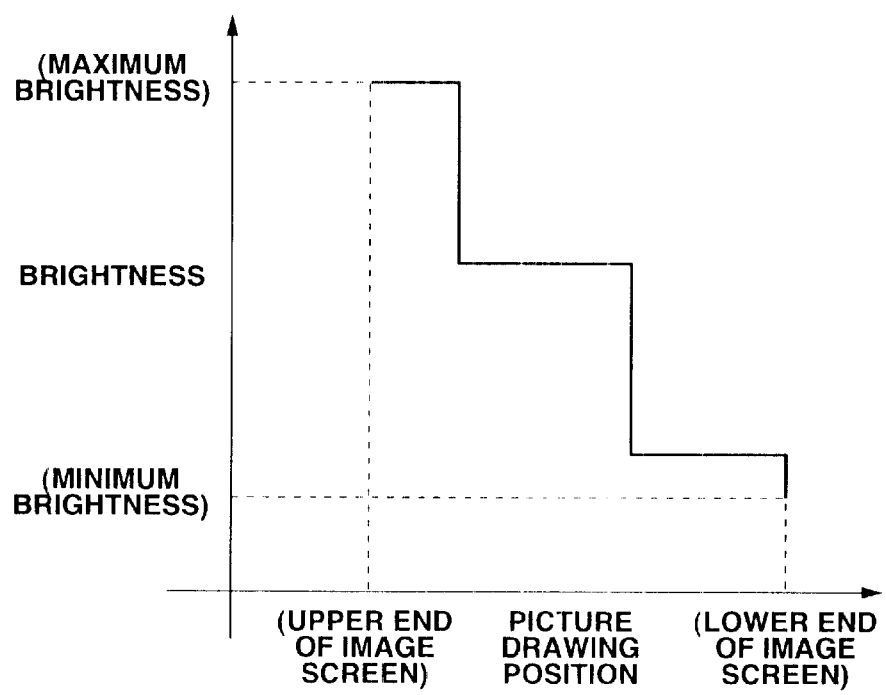
FIG. 10 is a characteristic graph representing the relationship between the image screen brightness in the third preferred embodiment of the vehicular display apparatus.
Figure 11:
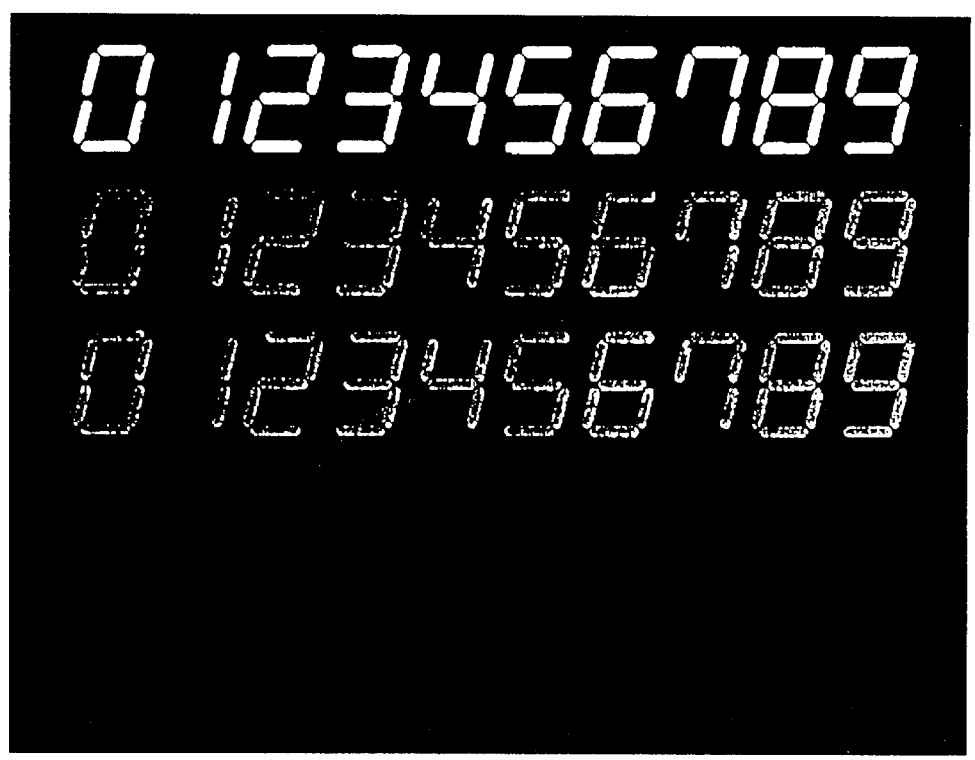
FIG. 11 is an explanatory view of a display example in the case of the third preferred embodiment of the vehicular display apparatus.

In the third embodiment, the image screen intensity is reduced in a stepwise manner from the upper side of image screen toward the lower side thereof, as shown by a characteristic graph of FIG. 10. Consequently, the screen can display the image in which the image at the upper side thereof is bright, an intermediate part thereof is slightly bright, and the lower side is dark, as shown in FIG. 11.

That is to say, the gross quantity of the brightness of the whole image screen is reduced by reducing the brightness of the intermediate and lower parts of the image screen and the useless stimulation to the driver's sense of vision can be avoided. Consequently, the adaptation of the sense of vision to the dark field of view region can be promoted.

On the other hand, the vehicular velocity and another information that is still needed to be displayed even under such a situation requiring the relatively much attention as the vehicular entrance of the tunnel can be continued to be displayed at the position which is relatively near to the line of sight when the driver gazes the vehicular forward direction. In addition, since the image screen intensity is varied in the stepwise manner, the image screen intensity can be calculated by a relatively simple calculation and it becomes easy to establish a corresponding relationship between importance and criticality of display contents and image screen intensity (brightness).

Referring back to FIG. 9, after the process of gradually reducing the intensity of image screen is carried out at step ST39, controller 7 measures sequentially the elapsed time at a step ST40. If the predetermined time has passed (Yes at a step ST41), the image screen of display 2 is returned to the original nighttime (purpose) image screen at a step ST42. It is noted that, if the vehicular running position of place is not within the tunnel interval and the present time is not in the daytime (No at step ST37), no image processing is carried out (step ST38).

In the third embodiment, the method of gradually reducing the brightness of the image screen is to reduce the brightness in the stepwise manner. Hence, the load of vehicular display apparatus 1 onto the image processing can be reduced with the contents of display made correspondent to the brightness of the image screen.

(Fourth Embodiment)

Next, the fourth preferred embodiment of the vehicular display apparatus will be described below.

The vehicular display apparatus in the fourth preferred embodiment has the same structure as shown in FIG. 1.

Figure 12:
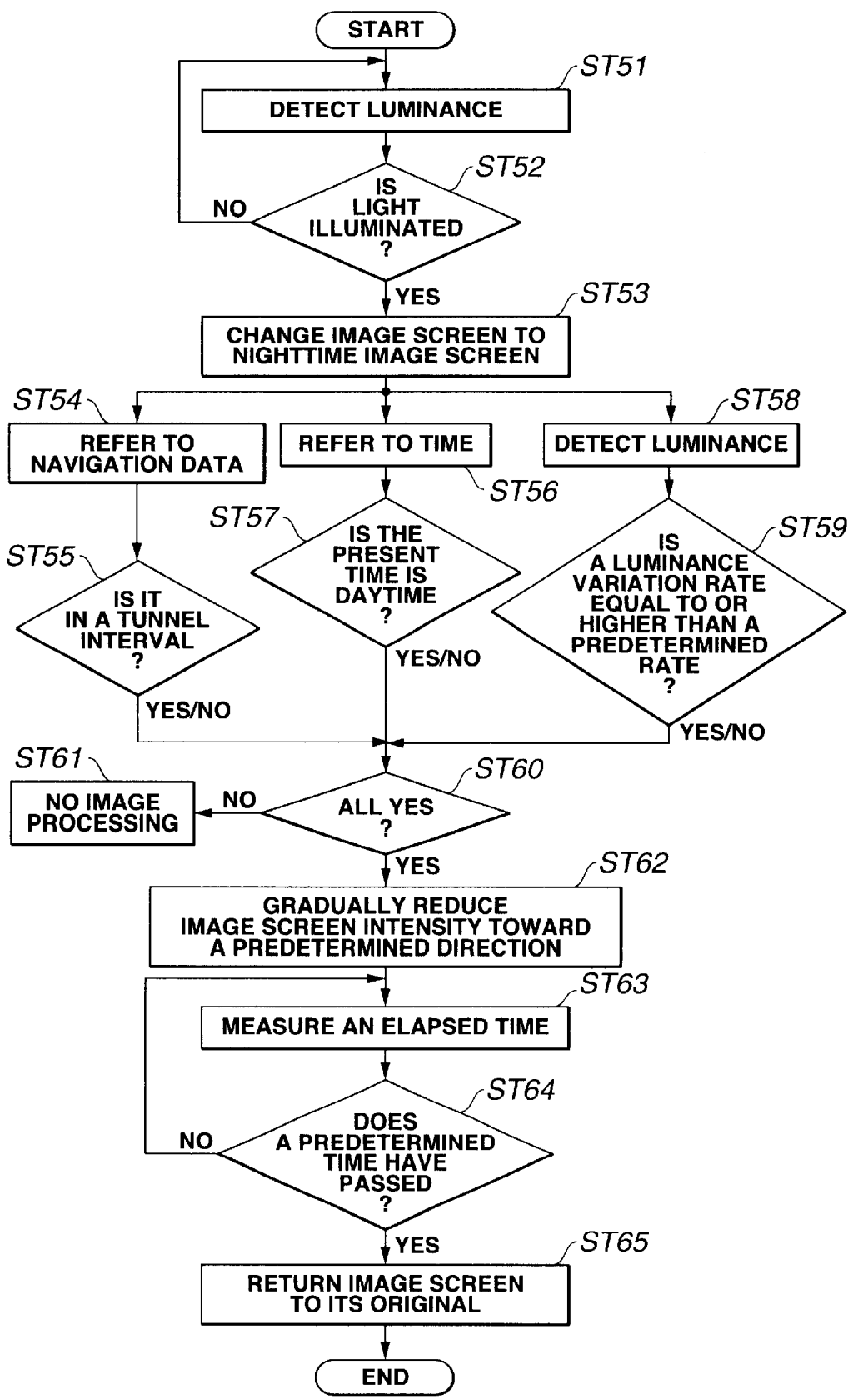
FIG. 12 is an operational flowchart representing a procedure executed in the fourth preferred embodiment according to the present invention.

When the vehicular ignition switch is turned on, the routine shown in FIG. 12 is started. At a step ST51, luminance sensor 4 detects the luminance surrounding the vehicle. Furthermore, controller 7 determines from luminance sensor 4 whether the light device (headlights and/or small lights) is turned on at a step ST52. If the light device is turned on (illuminated) (yes at a step ST52, the routine goes to a step ST53. At step ST53, controller 7 changes the present image screen to the nighttime screen. Then, controller 7 refers to road map data obtained from navigation device 6 at a step ST54. At a step ST55, controller 7 determines whether the vehicular present running position is within the tunnel from the road map data of navigation device 6. The data of the present time and date obtained by time detecting unit 5 are referred to at a step ST56. Controller 7 determines whether the present time is in the daytime at a step ST57. Furthermore, controller 7 determines whether the variation rate of the luminance detected by luminance sensor 4 is equal to or larger than the predetermined quantity at steps ST58 and ST59.

Then, if the vehicular running position is within the tunnel, is in the daytime, and the variation rate of luminance detected by luminance sensor 4 is equal to or larger than the predetermined rate (all yes at a step ST60), controller 7 determines that the vehicle is running at a situation such that the vehicle has entered the tunnel in the daytime of fine weather and carries out a process of gradually reducing the image screen of display 2 toward the predetermined direction (step ST62). The predetermined direction is the direction facing from a part of the image screen which is near to the line of sight of the vehicular driver toward a part of the image screen which is more distant from the line of sight of the vehicular driver when the vehicular driver gazed the vehicular forward direction.

Figure 13:
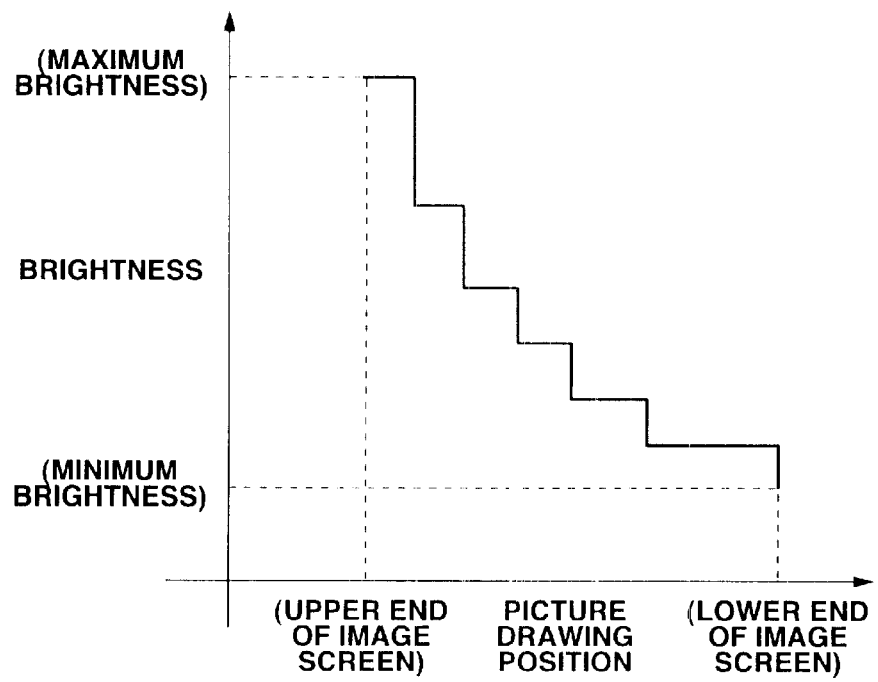
FIG. 13 is a characteristic graph representing the relationship between the image screen position and the variation in the image screen brightness in the fourth preferred embodiment of the vehicular display apparatus.
Figure 14:
FIG. 14 is a characteristic graph representing the relationship between the image screen position and the variation in the image screen brightness in the fourth preferred embodiment.

In the fourth embodiment, such a processing as gradually reducing the image screen in the stepwise manner (the number of steps are three or more than that in the case of the third embodiment) from the upper side of display 2 to the lower side thereof, as shown in a characteristic graph of FIG. 13. Consequently, as shown in FIG. 14, the screen can display the image in which the image at the upper side thereof becomes bright and the lower side thereof becomes dark so as to be almost invisible.

That is to say, the gross quantity of the brightness of the whole image screen can be reduced by reducing the brightness at the intermediate part and lower part of the image screen. Then, the useless stimulation of the driver's sense of vision can be avoided. Consequently, the adaptation of the sense of vision to the dark field of view environment can be promoted.

On the other hand, the vehicular velocity information or another information that is still needed to be displayed even under such a situation requiring the relatively much attention as the vehicular entrance of the tunnel can be continued to be displayed at the position which is near to the line of sight when the driver gazes the vehicular forward direction. In addition, since the image screen (intensity) brightness is varied in the stepwise manner, the image screen brightness (intensity) can be calculated by relatively simple arithmetic operations and it becomes easy to establish a corresponding relationship between importance and criticality of display levels and image screen intensity. Furthermore, the image screen intensity is controlled so as to be varied at multiple steps, the multiple step variation in the brightness are more effective in a case where the levels of display contents are various.

Referring back to FIG. 12, after the process to gradually reduce the intensity of image screen is carried out, controller 7 measures sequentially the elapsed time at a step ST63. Then, if the predetermined time has passed (Yes at a step ST64), the image screen of display 2 is returned to the original nighttime (purpose) image screen at a step ST65. It is noted that, if the vehicular running position is not within the tunnel and the present time is not in the daytime (No at step ST60), no image processing is carried out (step ST61).

In the fourth preferred embodiment, the direction toward which the brightness of the display image screen is gradually reduced corresponds to a vertical direction from the upper side of the image screen to the lower side thereof. Hence, the load of vehicular display apparatus 1 onto the image processing can be reduced.

(Fifth Embodiment)

Next, the fifth preferred embodiment of the vehicular display apparatus will be described below. The structure of the fifth embodiment is the same as shown in FIG. 1. It is, however, noted that, in the fifth preferred embodiment, luminance sensor 4 and navigation device 6 shown in FIG. 1 are not always needed.

Figure 15:
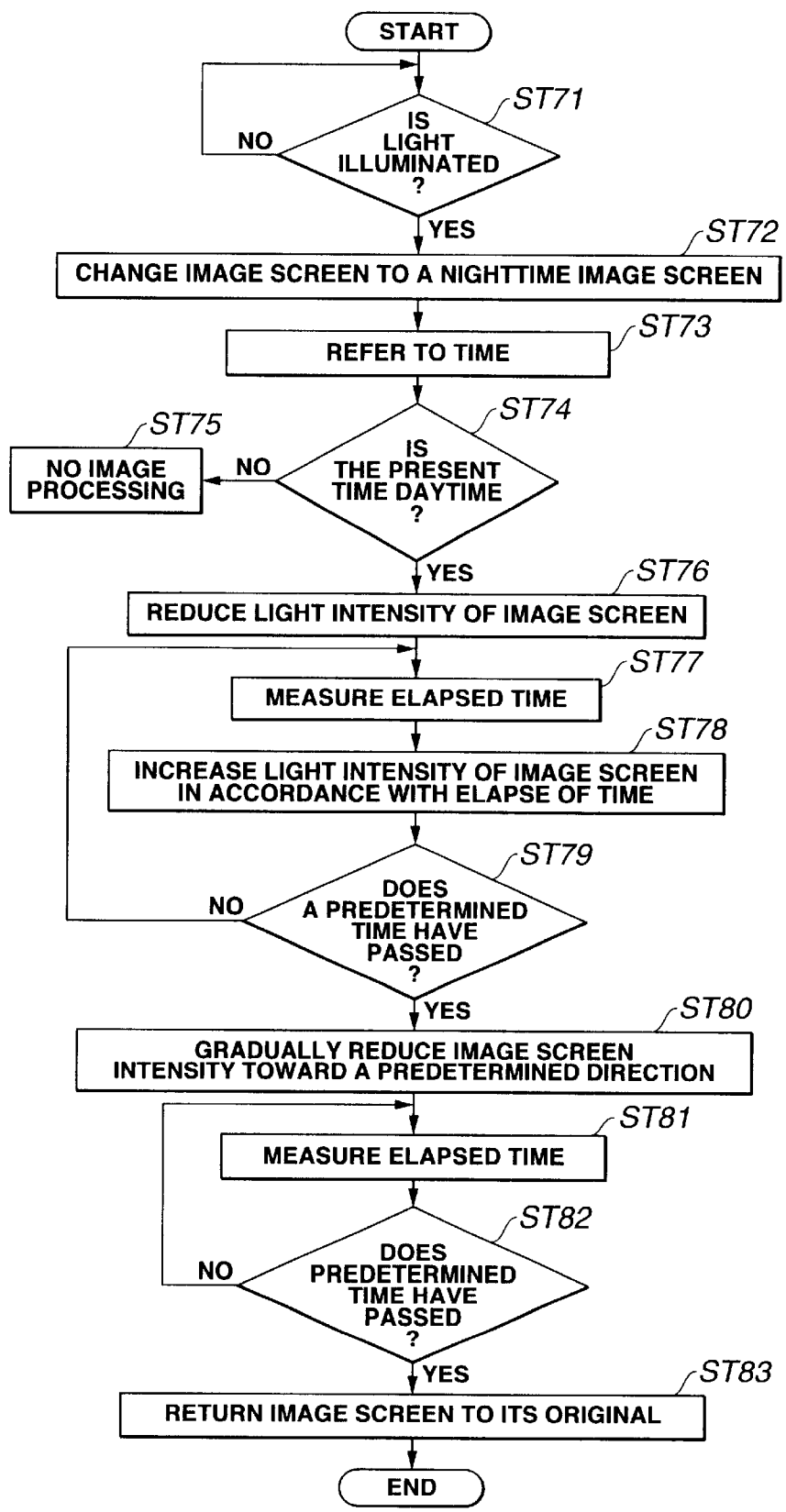
FIG. 15 is an operational flowchart representing a procedure executed in the vehicular display apparatus in the fifth preferred embodiment.

An operation of the fifth preferred embodiment will be described with reference to a flowchart of FIG. 15. If the vehicular ignition switch is turned on, the routine shown in FIG. 15 is started. Controller 7 determines if the light device (headlights and/or small lights) is turned on (a step ST71). Then, if, for example, the vehicle has entered the tunnel and the turn on of the vehicular light device has been detected (Yes at step ST71), the image screen of display 2 can be changed to the nighttime (purpose) image screen (a step ST72).

At the next step ST73, controller 7 refers to the data on the present time and date detected by time detecting unit 5.

At a step ST74, controller 7 determines whether the present time is in the daytime. If the present time is in the daytime (Yes at step ST74), the routine goes to a step ST76 in which a light intensity of the image screen of display 2 is once reduced (step ST76). Thereafter, controller 7 measures the elapsed time at a step ST77 and gradually increases the light intensity of image screen in accordance with the elapsed time at a step ST78. After the predetermined time has passed (Yes at a step ST79), controller 7 varies the image screen intensity so that the image screen intensity is gradually reduced from the upper side to the lower side at a step ST80.

Figure 16:
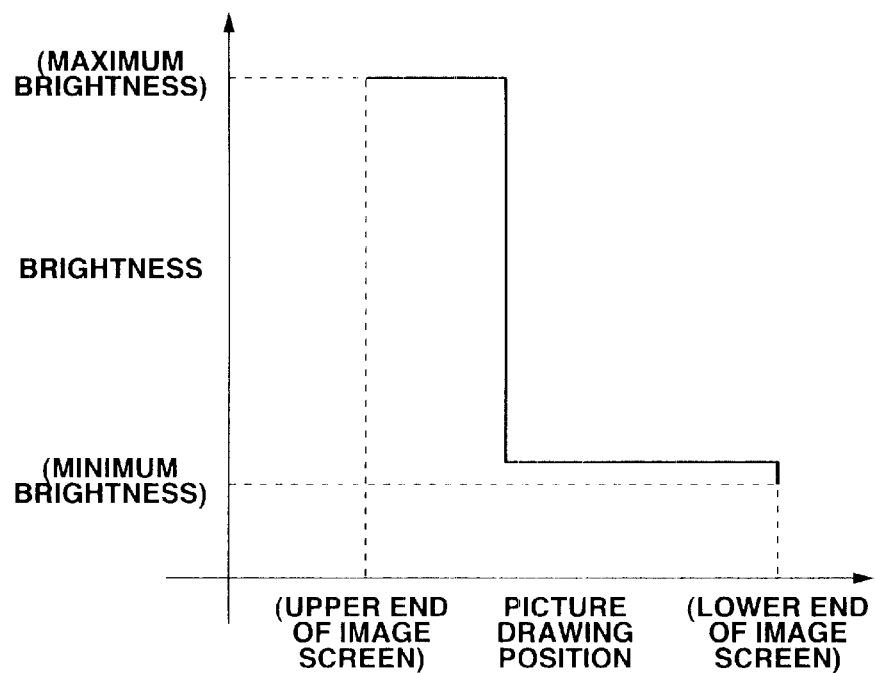
FIG. 16 is a characteristic graph representing the relationship between the image screen position and the variation in the image screen brightness in the fifth preferred embodiment.
Figure 17:
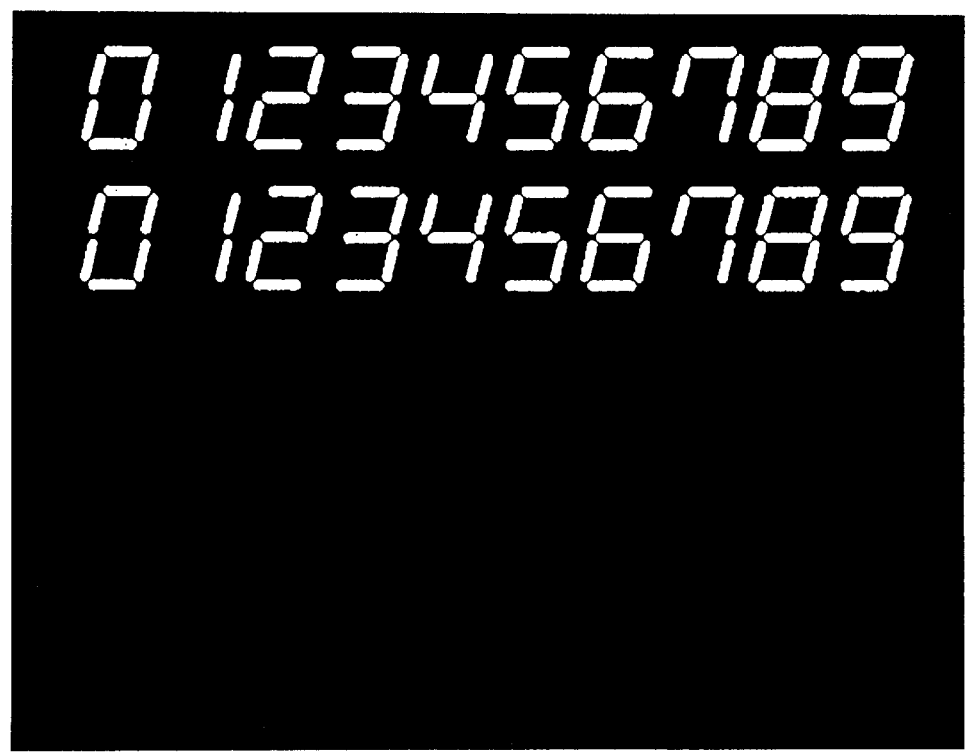
FIG. 17 is an explanatory view of a display example in the case of the fifth preferred embodiment.

In the fifth embodiment, as shown in a characteristic graph of FIG. 16, controller 7 carries out such a process as to vary the image screen intensity (brightness) at two steps between the upper and lower sides of image screen of display 2. Consequently, as shown by a display example of FIG. 17, the image screen display in which the image at the upper side of the image screen becomes bright and the lower side thereof, in turn, becomes dark so as to be almost invisible. That is to say, the gross quantity of the brightness of the whole image screen is reduced by reducing the intensity at the lower side of image screen, the useless stimulation of the driver's sense of vision can be avoided. Consequently, the adaptation of the sense of vision to the dark field of view environment can be promoted.

On the other hand, since the luminous intensity (brightness) of upper side of the image screen is not reduced, the vehicular velocity and another information that is still needed to be displayed even under such a situation requiring the relatively much attention as the vehicular entrance of the tunnel can be continued to be displayed at the position which is near to the line of sight when the driver gazes the vehicular forward direction. In addition, since the variation of the intensity on the image screen is in the stepwise manner (in this case, the two steps), the image screen intensity can be calculated by a relatively simple calculation method and it becomes easy to establish the corresponding relationship between the importance and criticality of the levels of display contents and image screen intensity.

After the process of a gradual reduction in the intensity of the image screen is carried out (step ST80), controller 7 measures sequentially the elapsed time at a step ST81. After the elapse of the predetermined time (Yes at a step ST82), the image screen of display 2 is returned to the original nighttime (purpose) image screen at a step ST83. It is noted that if the present time is not in the daytime (No at step ST74), no image processing is carried out (step ST75).

The details of series of processes (steps ST76 through ST80) on the once light intensity reduction of image screen and the light intensity increase thereof will be described below.

For example, suppose that the image screen of display 2 is once turned in a non-display state. At this time, the once non-display state is effective in that the sense of vision is promoted to be adapted to the dark field of view environment. Such a situation as described above will be described with reference to a characteristic graph in FIG. 18.

Figure 18:
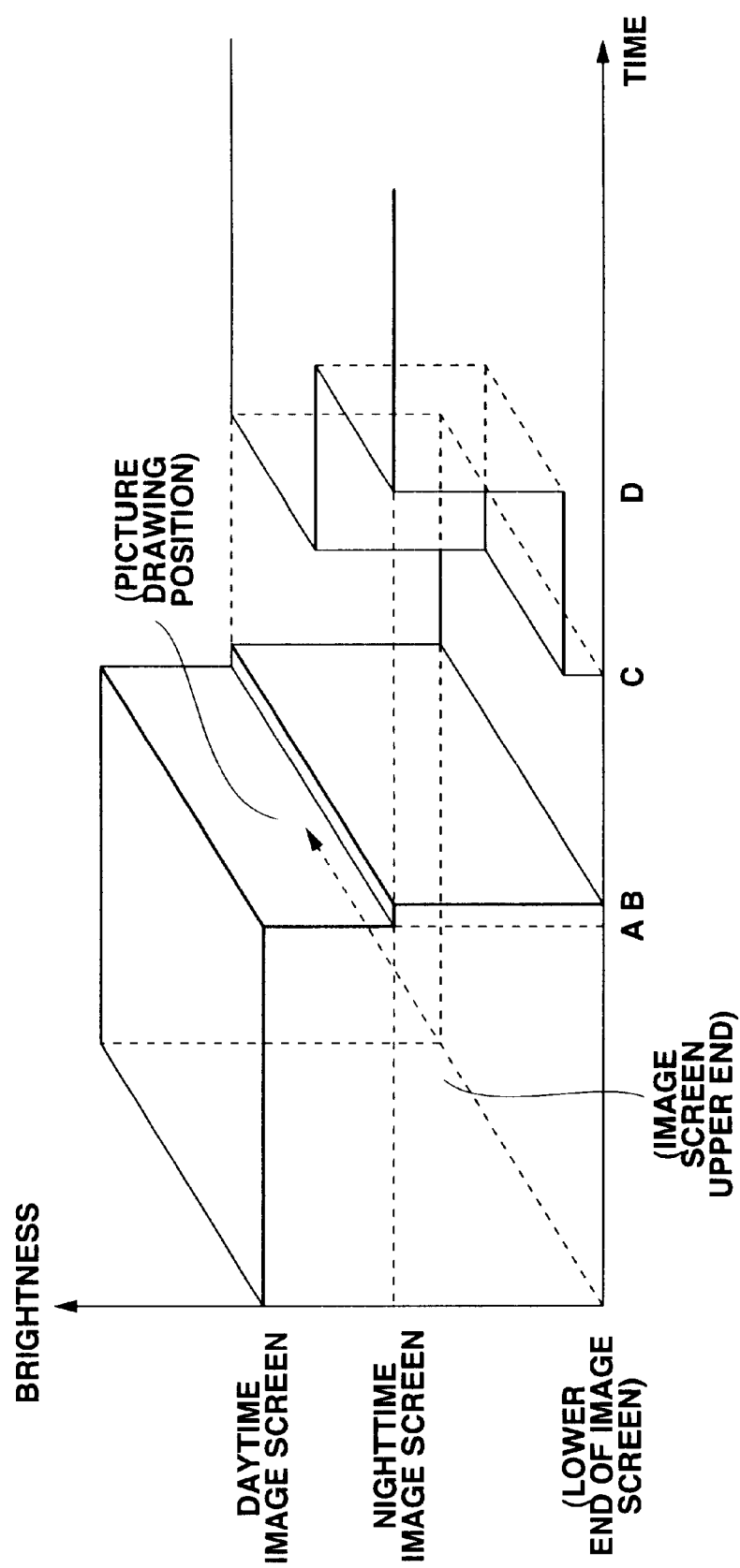
FIG. 18 is a characteristic graph representing a first example of a relationship from among the image screen position, the image screen brightness, and an elapse of time in the case of the fifth preferred embodiment.

FIG. 18 is the characteristic graph representing three elements of a time, the image screen brightness, and vertical positions of the image screen in a three-dimensional manner. A lateral axis of FIG. 18 denotes the time, a longitudinal axis thereof denotes the image screen brightness, and a depth axis thereof denotes the image screen vertical position.

In FIG. 18, A denotes a time point at which the light device is turned on and the image screen of display 2 is changed to the nighttime (purpose) image screen (the nighttime image screen means an image screen in which the brightness is slightly reduced for a nighttime view). Next, B denotes a time point at which the present time is determined to be in the daytime (a case where, although it is in the daytime, the light device is turned on according to the entrance of the vehicle into the tunnel). At time point B, the image screen is rendered to be in the non-display state (a state wherein the whole image screen is darkened).

Thereafter, the predetermined time has passed and the image screen display is carried out to gradually reduce the brightness at a time point C over a whole image region from the upper side of image screen to the lower side thereof. Next, at a time point D upon the end of a further time elapse, the whole image screen is set to the nighttime screen.

Since, in the above-described procedure, the image screen of display 2 is once in the non-display state in a case where the vehicle has entered the tunnel, the driver's sense of vision can be promoted to be adapted to the dark field of view environment.

Figure 19:
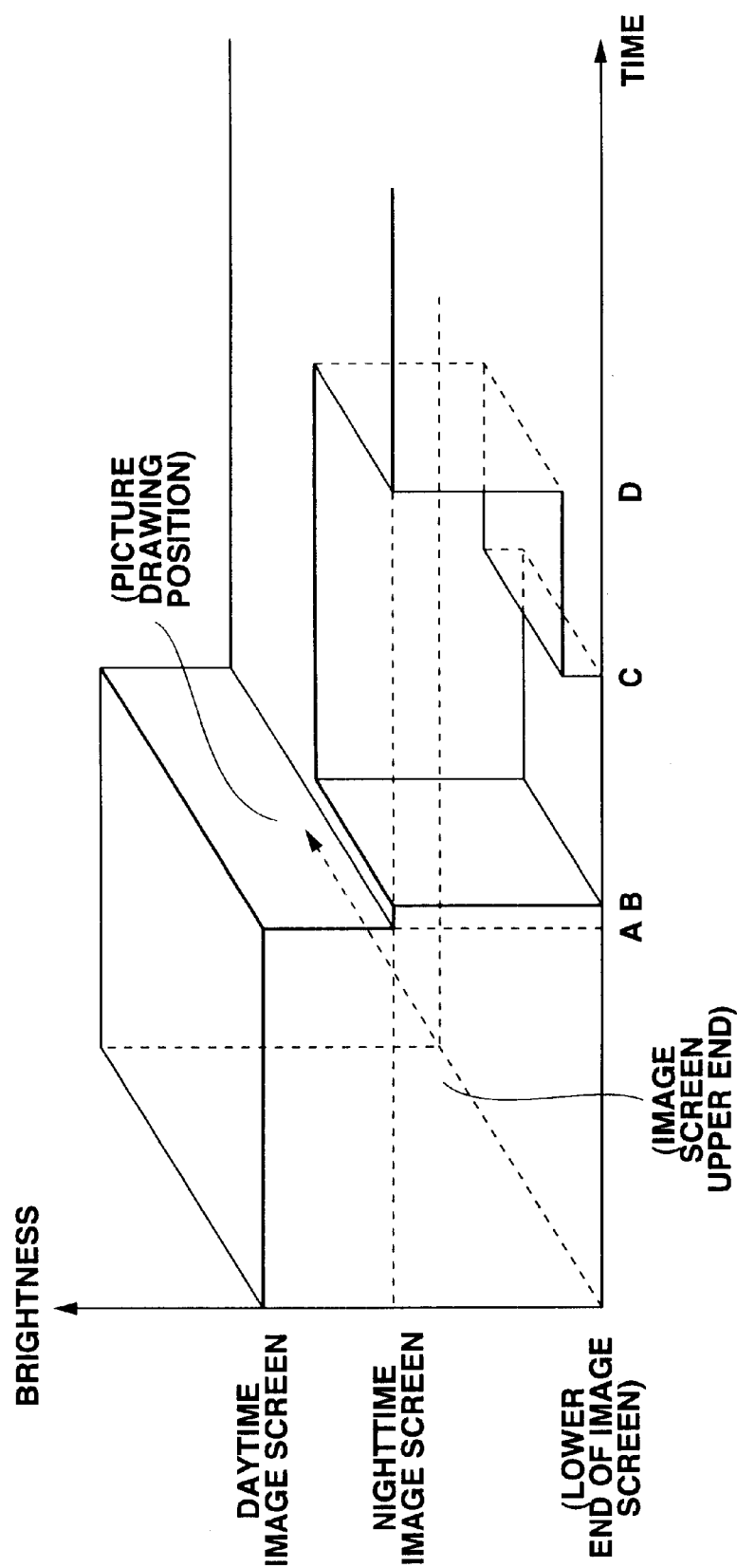
FIG. 19 is a characteristic graph representing a second example of the relationship from among the image screen position, the image screen brightness, and an elapse of time in the case of the fifth preferred embodiment.

In addition, in the example shown in FIG. 18, when the vehicle has entered the tunnel, the whole image screen of display 2 is once in the non-display state. However, in a case where the important information such as the vehicular velocity is displayed at the upper side of the image screen, it is effective that the light intensity reduction process for only the image region on which this information is displayed is not carried out. This situation will be described below with reference to a characteristic graph shown in FIG. 19. As shown in FIG. 19, this display method is substantially the same as the display method shown in FIG. 18. When the vehicle has entered the tunnel at time point B, only the lower side is turned in the non-display state without reduction in the light intensity (brightness) at the upper side of the image screen of display 2. That is to say, the brightness of the upper side of the image screen is not reduced but left in the nighttime screen brightness.

Hence, the information on high importance and high criticality such as that on the vehicular velocity and so forth to be displayed on the upper side of the image screen can positively be displayed and viewed.

Figure 20:
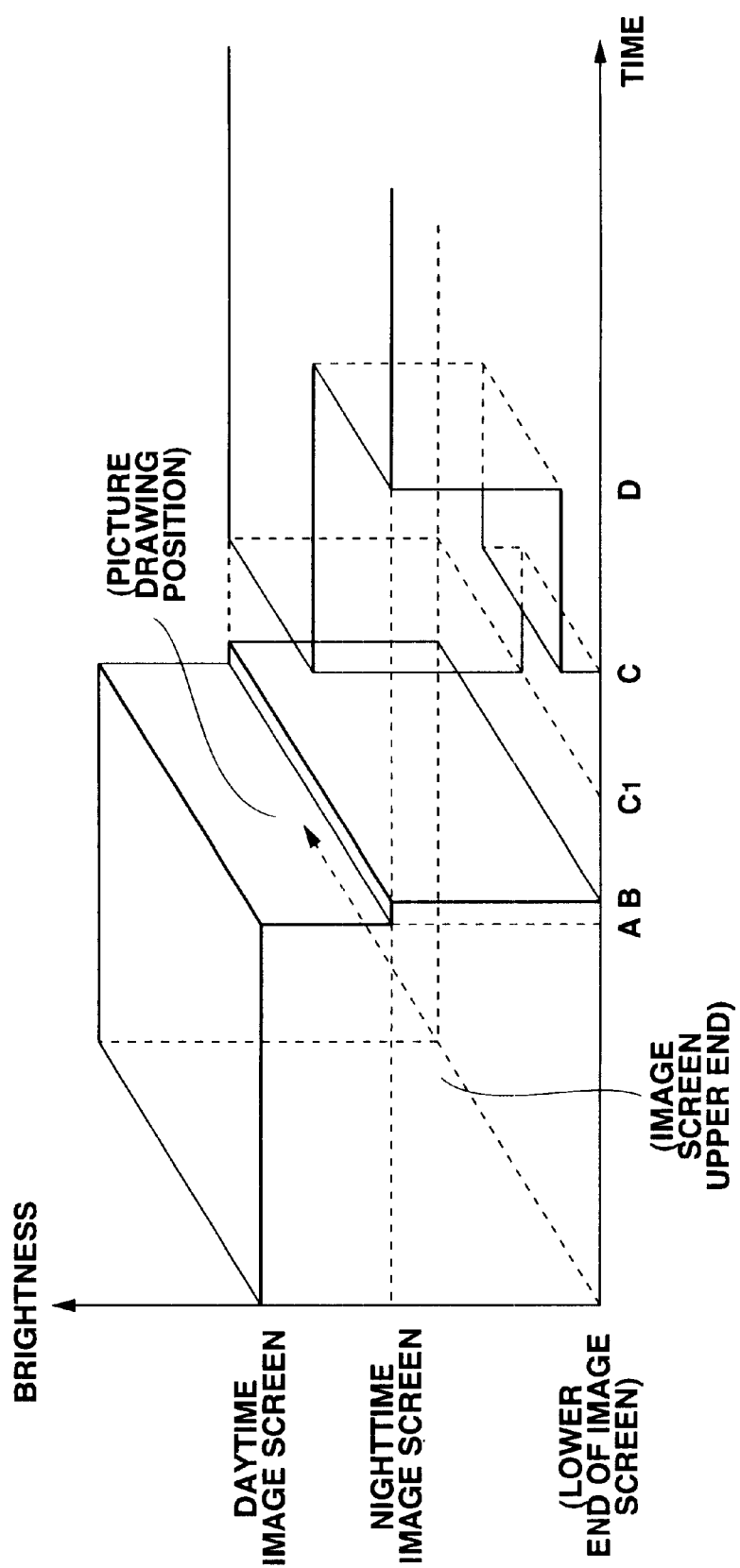
FIG. 20 is a characteristic graph representing a third example of the relationship from among the image screen position, the image screen brightness, and an elapse of time in the case of the fifth preferred embodiment.

In the example shown in FIG. 18, the method has been described in which the whole image screen is once in the non-display state and the brightness of image screen is, thereafter, gradually reduced from the upper side to the lower side at time point C. It is, however, possible to display the region of the image screen at the upper side at which the information having high importance and criticality is to be displayed at an earlier timing than time point C. That is to say, as shown in FIG. 20, after the whole image screen is once in the non-display state at time point B, the display of only the upper side region of image screen is started at a time point C1 which is earlier than time point C and the display of the lower side region is started at time point C later than time point C1. At this time, the adaptability of the driver's sense of vision to the dark field of view environment can be increased and the information having the importance and criticality can be displayed at an earlier time. The information such as the vehicular velocity can visually be confirmed as early as possible.

Figure 21:
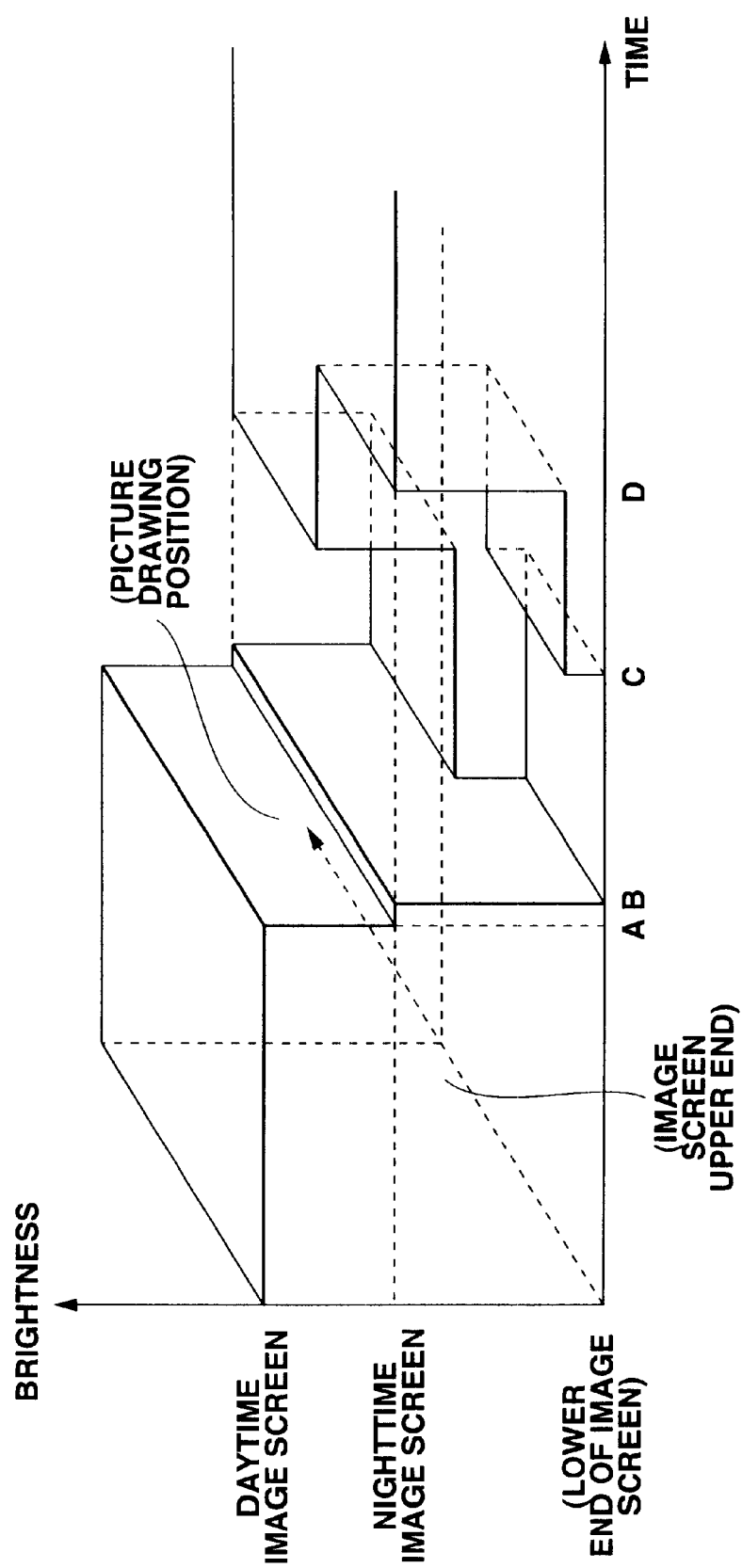
FIG. 21 is a characteristic graph representing a fourth example of the relationship from among the image screen position, the image screen brightness, and an elapse of time in the case of the fifth preferred embodiment.

Furthermore, with reference to FIG. 19, the bright display of only the upper side region of image screen of display 2 has been described. However, it is possible for the image to be displayed with the brightness of the upper side region reduced as compared with that in the nighttime screen and with only the lower region of image screen in the non-display state when the vehicle has entered the tunnel. That is to say, a light intensity increase rate is modified between the upper side region and the lower side region. FIG. 21 is a characteristic graph representing this situation. As shown in FIG. 21, at time point B at which the vehicle has entered the tunnel, the region of the lower side of the image screen is turned in the non-display state and the display having the reduced brightness at the upper side of image screen is carried out. The display method after time point C is the same as the example shown in FIG. 18.

If each or any one of the above-described methods shown in FIGS. 18 through 21 is adopted in the display method, the adaptability of the driver's sense of vision to the dark field of view environment can be increased and the information on high performance and high criticality can positively be displayed even under a state in which the brightness is reduced. Hence, the information can visually be confirmed by the driver at an instant time. In the example shown in FIG. 18, the case where the brightness of the image screen is instantly switched at time point C has been described. Alternatively, a gradual switching of the image screen brightness may be achieved.

Figure 22:
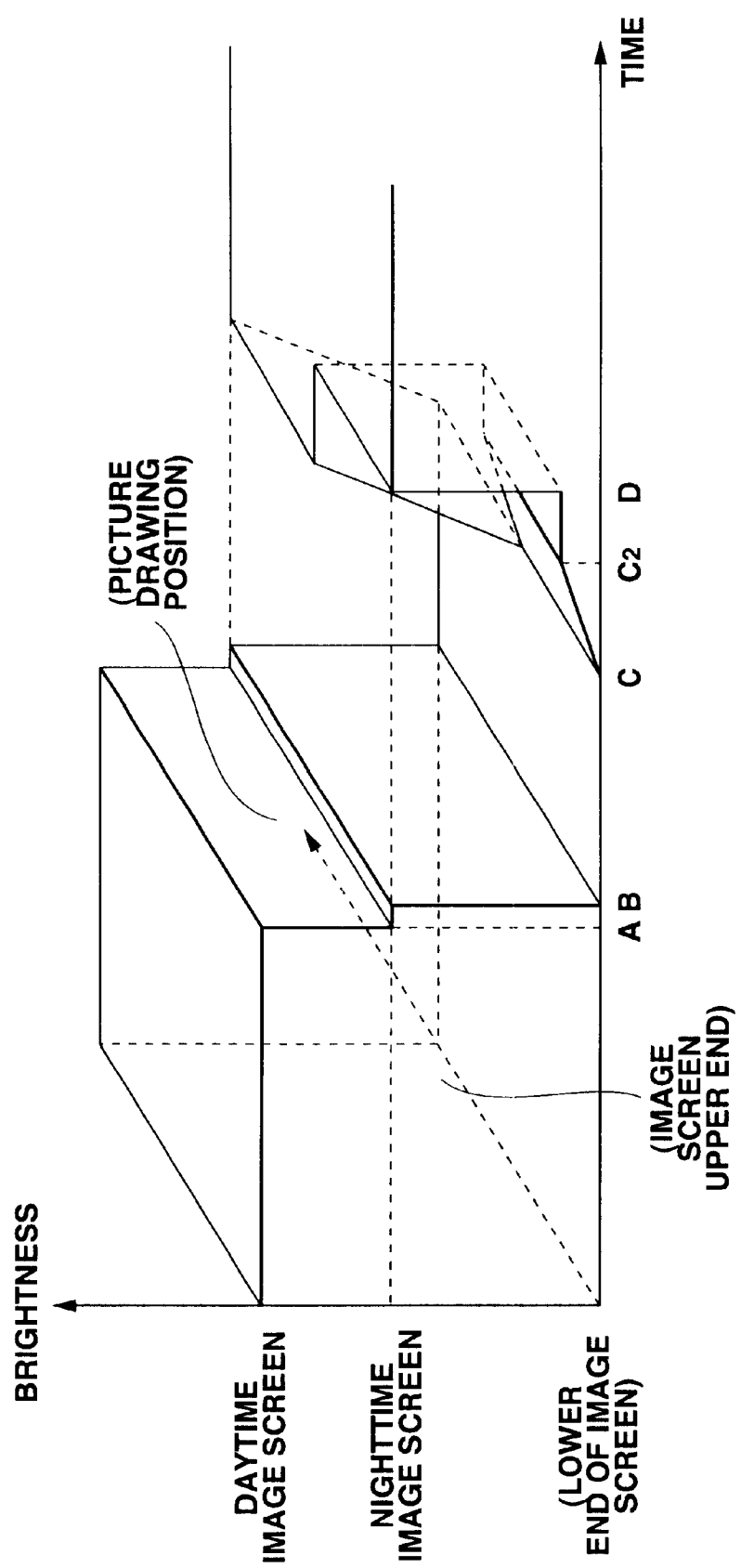
FIG. 22 is a characteristic graph representing a fifth example of the relationship from among the image screen position, the image screen brightness, and an elapse of time in the case of the fifth preferred embodiment.

That is to say, as shown in a characteristic graph of FIG. 22, the brightness may be increased in a linear function manner over a time elapse from time point C to a time point C2 which is later than time point C and such an image screen as having a two-stage brightness may be achieved. In this case, as described with reference to the example of FIG. 20, for time point C, the brightness may be set to be different between the upper side region of image screen and the lower side region thereof.

Figure 23:
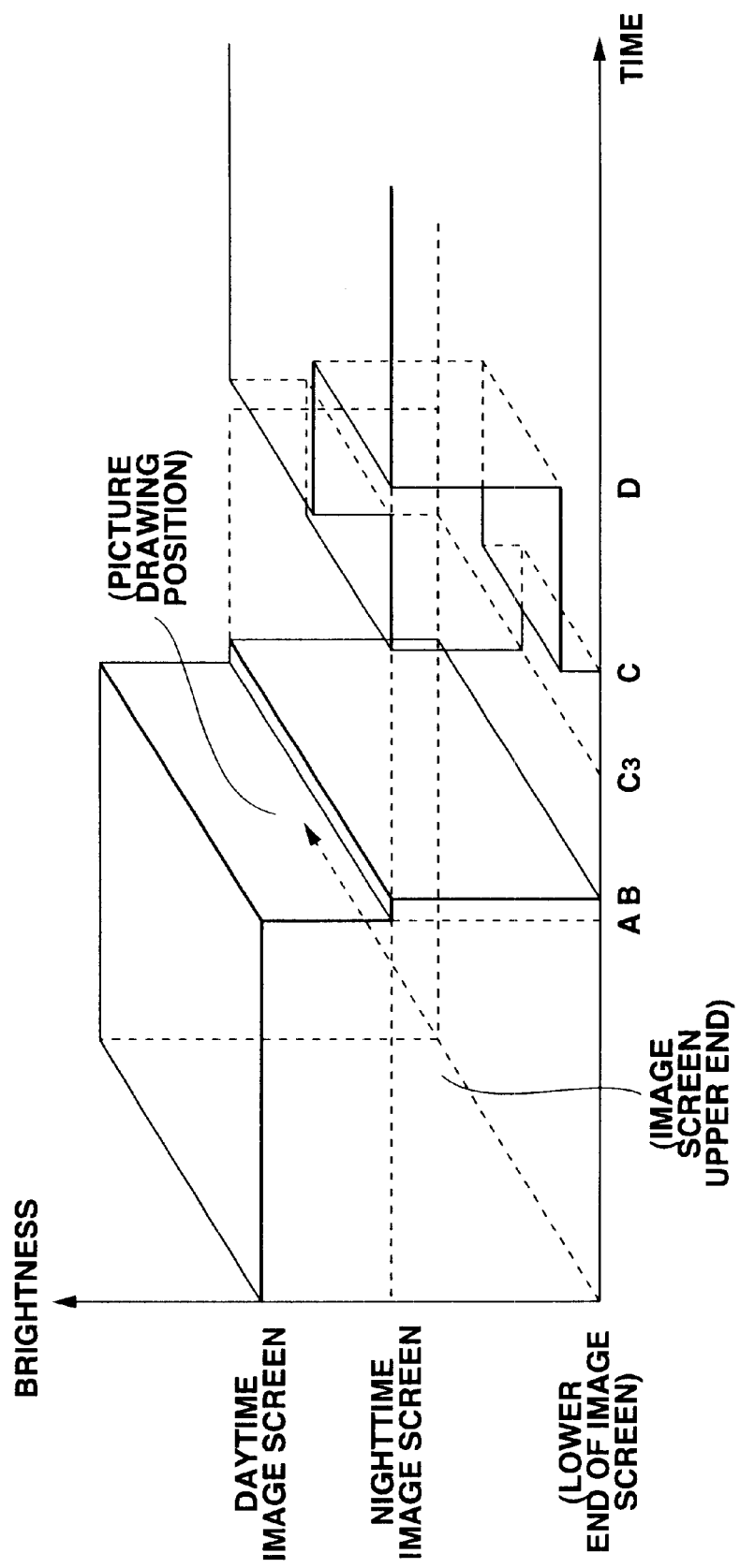
FIG. 23 is a characteristic graph representing a sixth example of the relationship from among the image screen position, the image screen brightness, and an elapse of time in the case of the fifth preferred embodiment.

Furthermore, as shown in a characteristic graph of FIG. 23, a time point C3 prior to time point C is set and it is possible to increase the light intensity of the upper side region of image screen in the stepwise manner at time point C3. It is noted that, although, in the example of FIG. 23, the two-stage light intensity increase is carried out, the light increase in three-stages or more may be carried out. It is possible to carry out the increase in light at the lower side of image screen in the stepwise manner.

Figure 24:
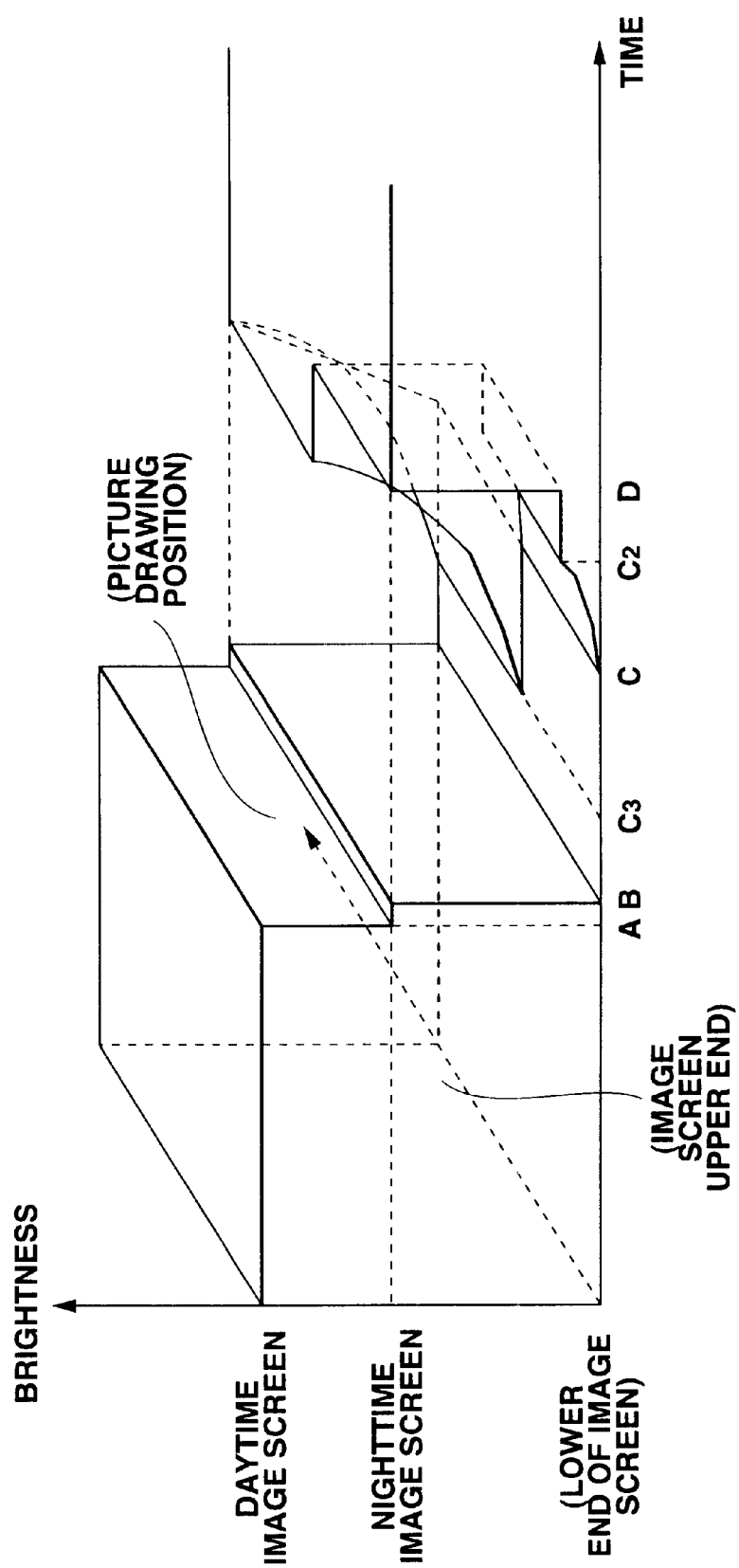
FIG. 24 is a characteristic graph representing a seventh example of the relationship from among the image screen position, the image screen brightness, and an elapse of time in the case of the fifth preferred embodiment.

In addition, as shown in a characteristic graph of FIG. 24, the upper side region of image screen may be increased in the exponential function manner from time point C3 and may be increased in the exponential function manner from time point C. It is noted that a time point at which the brightness of the image screen at the upper side region is gradually reduced may be different from that at which the brightness of the image screen at the lower side region thereof is gradually reduced. In addition, the time point at which the light intensity increase on the upper side region of the image screen is started may be the same as that at which the light intensity increase on the lower side region thereof is started (namely, time point C may be coincident with time point C3).

In addition, each image screen characteristic graphs shown in FIGS. 18 through 24 is not limited to the case shown in the stepwise variation in the screen brightness characteristic graph of FIG. 16, where the brightness is switched into two stages of the upper side region of the image screen and lower side region thereof. Each image screen display characteristic graph is applicable to the various cases where the brightness is gradually reduced from the upper side of the image screen to the lower side thereof.

In the fifth preferred embodiment, when such the predetermined condition of the vehicular state that the vehicle enters the tunnel in the daytime of the fine weather is detected, the light intensity is once reduced and, thereafter, the light intensity of the image screen is gradually increased. Hence, the adaptability of the sense of vision to the dark field of view environment can furthermore be promoted.

In addition, in the fifth preferred embodiment, the light intensity of the image screen is once reduced and, thereafter, the rate of the gradual increase in the brightness of the image screen between a part of the image screen which is relatively near to the direction of the line of sight of the vehicular driver and another part thereof which is relatively distant from the direction of the line of sight thereof is modified. Hence, the part of the image screen which is relatively near to the direction of the line of sight from which there are many cases where a more important information is displayed can provide such a brightness that the information can be read at a relatively early timing. Then, the other part of the image screen which is relatively distant from the line of sight and which the vehicular driver rarely watches under the above-described vehicular state can be displayed in brightness to such a degree that the adaptability of the sense of vision to the dark field of view environment is not impeded.

In addition, in the fifth preferred embodiment, when the brightness of the image screen is gradually increased after the light intensity of the image screen is once reduced, the brightness of only a part of the image screen which is relatively near to the direction of line of sight of the vehicular driver remains unchanged. Hence, in such a display that the important information is displayed on the part of the image screen near to the direction of line of sight of the vehicular driver, the important information can be continued to be displayed in an appropriate brightness at any time (unless the power of vehicular display apparatus 1 is turned off).

In addition, in the fifth preferred embodiment, a time rate when the brightness of the image screen is gradually increased after the light intensity of the image screen is once reduced becomes smaller as the image screen becomes nearer to the part of the image screen which is near to the direction of line of sight. Hence, in the displayed image screen such that the relatively frequently viewing information is displayed on the part of the image screen near to the line of sight, the part of the image screen described above can provide the brightness in which the above-described information can be read at a relatively quick timing.

In addition, in the fifth preferred embodiment, the brightness of the image screen is increased in the linear manner with respect to time as a method of gradually increasing the brightness after the light intensity of the image screen is once reduced. Hence, the load of display 2 onto the image processing can be reduced.

In addition, in the fifth preferred embodiment, the brightness of the image screen is increased in the exponential function manner with respect to time as a method of gradually increasing the brightness after the light intensity of the image screen is once reduced. Hence, this display can provide the display characteristic which is appropriately accommodated to the human's visual characteristic.

Furthermore, in the fifth preferred embodiment, the brightness of the image screen is increased in the stepwise manner with respect to time as a method of gradually increasing the brightness after the light intensity of the image screen is once reduced. Hence, the load of vehicular display apparatus onto the image processing with the contents of display made correspondent to the brightness of the image screen can be reduced.

(Sixth Embodiment)

Next, the sixth preferred embodiment of the vehicular display apparatus according to the present invention will be described below.

The vehicular display apparatus in the sixth preferred embodiment has the same structure as shown in FIG. 1. It is noted that, in the sixth embodiment, both of luminance sensor 4 and navigation device 6 are not always needed. Hereinafter, an operation of the sixth preferred embodiment will be described with reference to a flowchart shown in FIG. 25.

Figure 25:
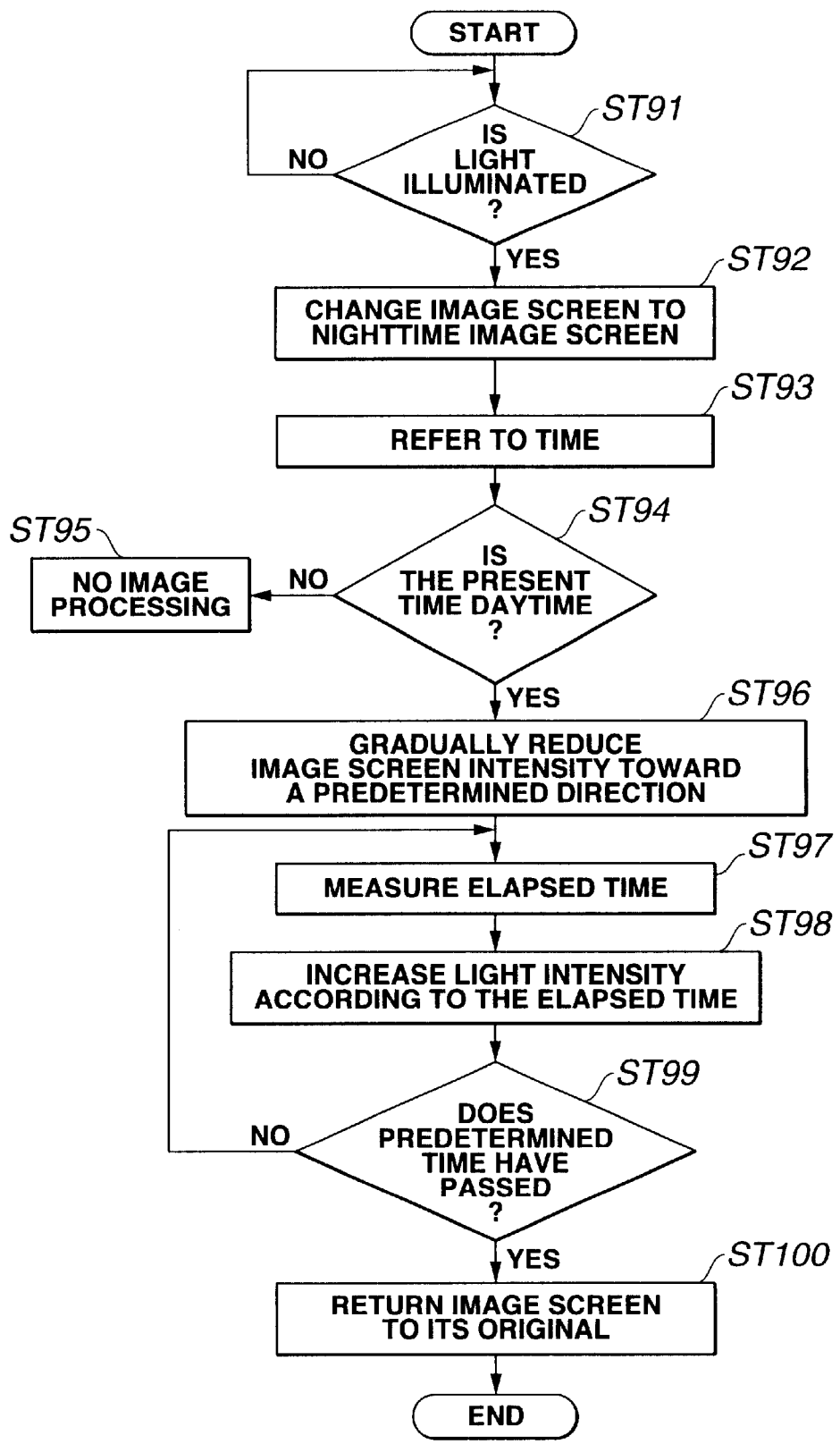
FIG. 25 is an operational flowchart representing a procedure executed in the vehicular display apparatus of the sixth preferred embodiment according to the present invention.

If the vehicular ignition switch is turned on, the routine shown in FIG. 25 is started. First, controller 7 determines whether the light device (headlights and/or small lights) is turned on (illuminated) at a step ST91. For example, if the vehicle has entered the tunnel and the vehicular light device is turned on (Yes at a step ST91), the image screen of display 2 is changed to the nighttime image screen.

Next, at a step ST93, controller 7 refers to data on the present time and date detected by time detecting unit 5. Controller 7 determines whether it is in the daytime (Yes at a step ST94) and carries out the image processing to gradually reduce the light intensity of image screen toward the predetermined direction at a step ST96. If No at step ST94, the routine goes to a step ST95 at which no image processing is carried out.

Figure 26:
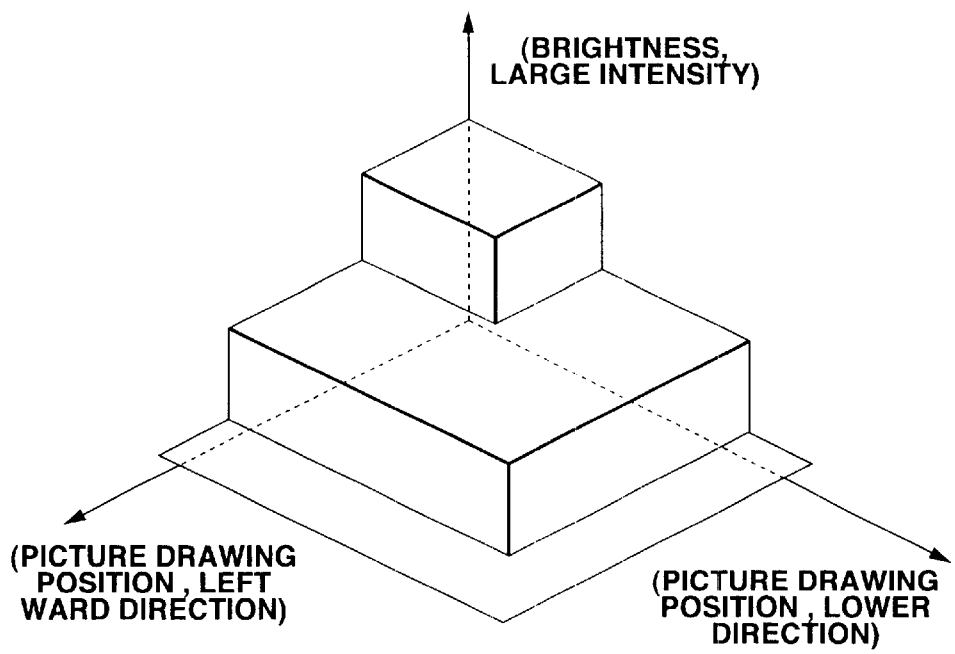
FIG. 26 is a characteristic graph representing the relationship between the image screen position and the variation in the image screen brightness in the sixth preferred embodiment.

FIG. 26 is a characteristic graph representing a relationship from among the brightness of image screen in the sixth preferred embodiment, vertical coordinates of the image screen, and horizontal coordinates thereof.

As shown in FIG. 26, in the sixth embodiment, a right upper side region (a case where the vehicle is a right-hand drive vehicle) of the image screen of display 2 is brightly displayed and is set so that the brightness is reduced in the stepwise manner obliquely toward the lower leftward direction. Then, as shown by the display example of FIG. 27, the image screen on the right upper side region is brightly displayed and is set for the brightness toward the lower and leftward direction of the image screen to be reduced in the stepwise manner.

Figure 27:
FIG. 27 is an explanatory view of a display example of the vehicular display apparatus in the sixth preferred embodiment.

As shown by the display example of FIG. 27, the image screen is brightly displayed on a right upper side region of image screen and the displayed portions at the lower end portion of the image screen and at the leftward end portion are so dark that the image screen thereat is almost invisible. That is to say, by reducing the light intensity of the left and lower side of the image screen, a gross quantity of the brightness of the whole image screen is reduced. Thus, the useless stimulation of the driver's sense of vision can be avoided. Consequently, the adaptation of the sense of vision to the dark field of view environment can be promoted.

On the other hand, since the light intensity of the right upper side of image screen is not reduced, the display of the vehicular velocity and another information that is still needed to be displayed even under such a situation in which the relatively much attention is required as the vehicular entrance of the tunnel can be continued to be displayed at a position of image screen which is near to the line of sight when the driver gazes the vehicular forward direction.

In addition, since the light intensity on the image screen is varied in the stepwise manner (in this case, three steps), the image screen intensity can be calculated by the relatively simple calculation method and it becomes easy to establish a corresponding relationship between levels (importance and criticality) of the display contents and image screen intensity.

Referring back to FIG. 25, controller 7 measures the elapse of time at a step ST97 and carries out the process of the gradual increase in light intensity of image screen in accordance with the elapse of time (Yes at a step ST98). This process of step ST98 is carried out by giving a natural (soft) feeling to a variation in brightness when the image screen is returned to the nighttime image screen.

After the predetermined time has passed (Yes at step ST99), the image screen intensity has reached to the original nighttime (purpose) image screen (at a step ST100). It is noted that the vehicular display apparatus in the sixth embodiment according to the present invention is applicable to a left-hand drive vehicle although the example of the application to the right-hand drive vehicle has been described. In the case of the left-hand drive vehicle, the display image screen is symmetrically disposed with respect to the case of the right-hand drive vehicle.

In the sixth preferred embodiment, the direction toward which the brightness of the image screen is gradually reduced corresponds to an oblique direction from the right upper side of the image screen to the left lower side thereof. Hence, in the case of the vehicle in which the driver's seat is positioned at the right side (the right hand drive vehicle), this brightness reduction direction can appropriately be accommodated to the driver's visual characteristic.

(Seventh Embodiment)

Next, the seventh preferred embodiment of the vehicular display apparatus according to the present invention will be described below. Vehicular display apparatus 1 in the seventh preferred embodiment has the same structure as shown in FIG. 1. It is noted that, in the seventh embodiment, both of the light turn-on state detecting unit 3 and navigation device 6 are not always needed.

Figure 28:
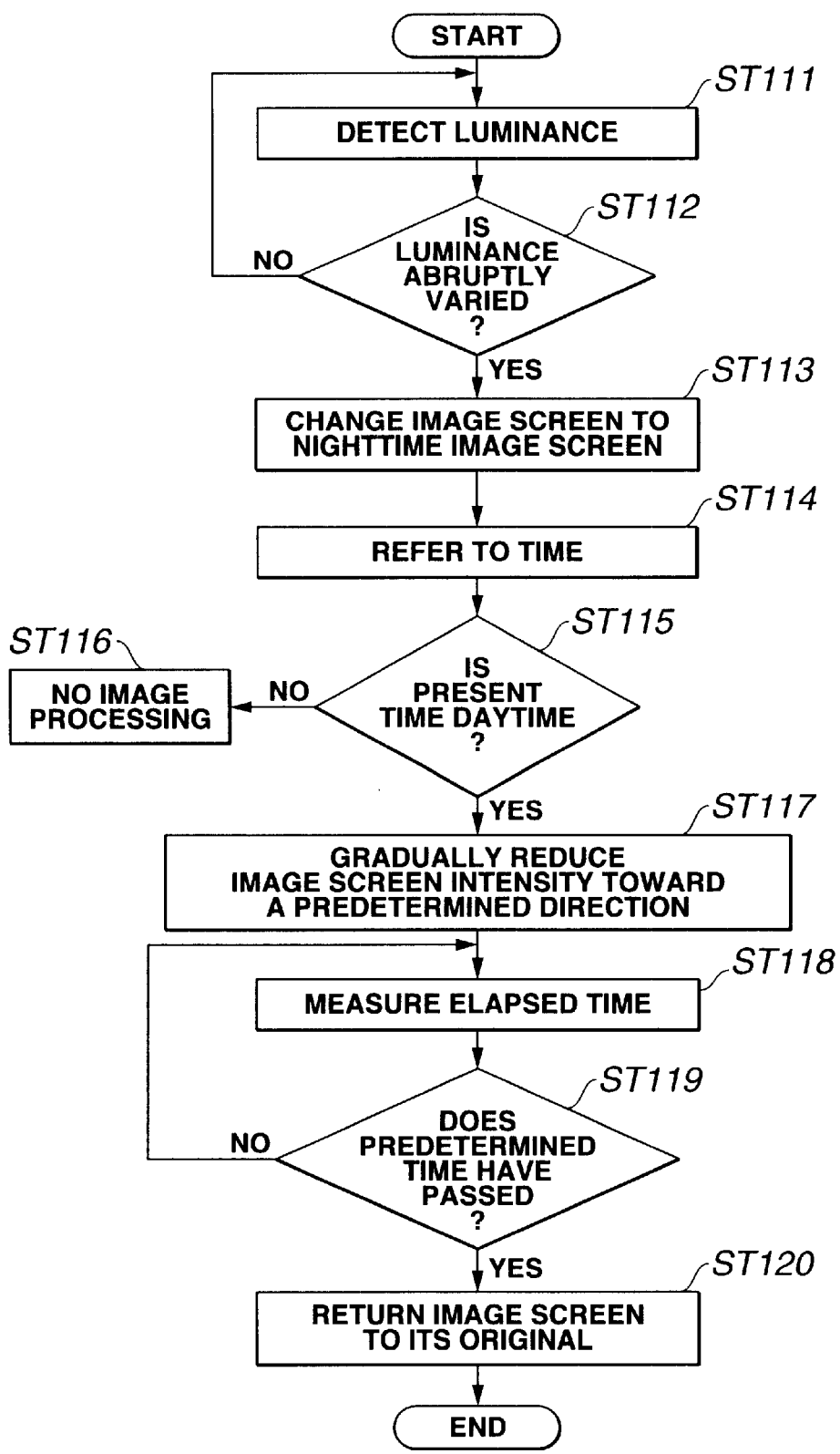
FIG. 28 is an operational flowchart representing a procedure executed in the seventh preferred embodiment of the vehicular display apparatus.

An operation of the seventh preferred embodiment will be described with reference to a flowchart of FIG. 28. If the vehicular ignition switch is turned on, the routine shown in FIG. 28 is started.

Figure 29:
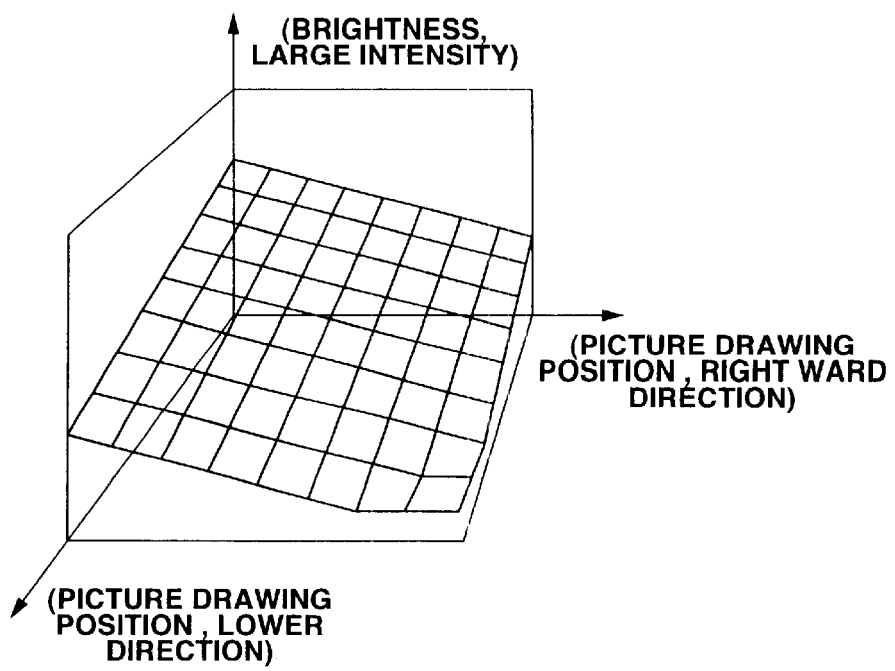
FIG. 29 is a characteristic graph representing the relationship between the image screen position and the variation in the image screen brightness in the seventh preferred embodiment.
Figure 30:
FIG. 30 is an explanatory view of a display example of the vehicular display apparatus in the seventh preferred embodiment.

First, controller 7 detects the luminance surrounding the vehicle from luminance sensor 4 at a step ST111. Then, controller 7 determines whether the luminance detected by luminance sensor 4 is abruptly varied at a step ST112. If the variation rate of luminance per predetermined time is large (Yes at a step ST112), such a process as to change the image screen of display 2 to the nighttime (purpose) image screen at a step ST113. Furthermore, controller 7 refers to the data on the present time and date detected by time detecting unit 4 at a step ST114. At a step ST115, controller 7 determines whether the present time is in the daytime. If controller 7 determines that the present time is not in the daytime (No at a step ST115), no image processing is carried out at a step ST116. If controller 7 determines that the present time is in the daytime (Yes at a step ST115), such a process as to gradually reduce the image screen intensity on display 2 toward the predetermined direction is carried out at a step ST117. In the seventh embodiment, the case where the above-described series of processes are applied to the left-hand drive vehicle has been described. As shown in FIG. 29, the brightness is gradually reduced in the linear manner from a left upper position of the image screen to a right lower position thereof. Consequently, as shown in FIG. 30, a portion of the image screen placed in the proximity to a left upper end thereof is brightly displayed (with high brightness) and, as the portion of the image screen is directed toward a right lower direction, the image screen gradually becomes darker. The image screen at the right lower side has the brightness to a degree that the image screen at the right lower position is almost invisible. That is to say, the gross quantity of the brightness of the whole image screen is reduced by reducing the light intensity of the image screen at its right lower side. Thus, the useless stimulation of the driver's sense of vision can be avoided. Consequently, the adaptation of the sense of vision to the dark field of view environment can be promoted. On the other hand, the display of the vehicular velocity and another information that is still needed to be displayed even under a situation that the relatively much attention is required can be continued to be displayed at a position of the image screen which is near to the line of sight when the driver gazes the vehicular forward direction.

In addition, since the image screen intensity is linearly varied, the image screen intensity can be calculated by the relatively simple calculation method. Thereafter, controller 7 measures the elapse of time at a step ST118. If the predetermined time has passed (Yes at a step ST119), controller 7 returns the image screen of display 2 to its original nighttime (purpose) image screen at a step ST120.

It is noted that although the display example in a case where the vehicular display apparatus in the seventh preferred embodiment has been applied to the left-hand drive vehicle has been described, the display image screen may be disposed symmetrically with respect to that in the case of the right-hand drive vehicle.

In the seventh preferred embodiment, the direction toward which the brightness of the image screen is gradually reduced is a direction from the left upper side of the image screen to the right lower side thereof. Hence, in a case where the driver's seat is positioned at the left side (the left hand drive vehicle), this direction can provide the display characteristic which can appropriately be accommodated to the driver's visual characteristic.

(Eighth Embodiment)

Next, the eight preferred embodiment of the vehicular display apparatus according to the present invention will be described below. The vehicular display apparatus in the eighth preferred embodiment has the same structure as shown in FIG. 1. It is noted that, in the eighth embodiment, the light turn-on state detecting unit 3 is not always needed. An operation of the eighth preferred embodiment will be described with reference to a flowchart shown in FIG. 31. If the vehicular ignition switch is turned on, the routine shown in FIG. 31 is started. First, controller 7 detects the luminance surrounding the vehicle by luminance sensor 4 at a step ST141. Then, controller 7 determines whether the luminance detected by luminance sensor 4 is abruptly varied at a step ST142. If the variation rate of luminance per predetermined time is large (Yes at a step ST142), controller 7 carries out the process of changing the image screen to the nighttime (purpose) image screen at a step ST143. Furthermore, controller 7 refers to road data given by navigation device 6 at a step ST144 to determine whether the present running position is in the tunnel interval at a step ST145. At the same time, controller 7 refers to the data on the present time and date detected by time detecting unit 4 at a step ST146. At a step ST147, controller 7 determines whether the present time is in the daytime. Then, if the present running position is not in the tunnel interval nor in the daytime (No at a step ST148), no image processing is carried out (step ST149). On the other hand, if the present running position is in the tunnel interval and controller 7 determines that the present time is in the daytime (Yes at a step ST148), controller 7 determines that the vehicle has entered the tunnel in the daytime of fine weather. At a step ST150, controller 7 carries out the process such that the light intensity of the image screen of display 2 is once reduced (step ST150).

Thereafter, if the elapsed time is measured by controller 7 at a step ST151 and a predetermined time has passed (Yes at a step ST152), the routine goes to a step ST153. At step ST153, the image screen display is varied so that the image screen intensity is gradually reduced toward the predetermined direction. For example, in the case of the right-hand drive vehicle, such an image screen that the brightness is gradually reduced from a horizontal center of an upper end of image screen toward a position slightly offset to a leftward position from the horizontal center of the lower end of image screen or simply from the right end position of image screen to the left end position of the image screen.

Next, the predetermined elapsed time is measured (step ST154) and the light intensity of image screen is increased in accordance with the elapsed time at a step ST155. At a time point at which the predetermined time has passed (Yes at a step ST156), controller 7 returns the image screen to the original nighttime (purpose) image screen (a step ST157). The process of returning the brightness to the nighttime image screen includes one of the methods which varies the brightness in a linear manner, in a stepwise manner, or in the exponential function manner, as explained in FIGS. 18 through 24. In the vehicular display apparatus of the eighth preferred embodiment, the gross quantity of the brightness of image screen is reduced in the same way as described in each of the first through seventh embodiments. Therefore, the adaptability of the driver's sense of vision to the dark field of view environment can be improved. In addition, the necessary information can positively be recognized by the vehicular driver from the image screen of the display.

The term of gradually means at the gradient substantially slower than the step change. It is noted that the term of the brightness on the image screen used in the whole specification and drawings is deemed to have the same meaning as the illumination intensity of the image screen.

The entire contents of a Japanese Patent Application No. 2000-307546 (filed in Japan on Dec. 5, 2000) are herein incorporated by reference. Although the invention has been described above by reference to certain embodiment of the invention, the invention is not limited to the embodiments described above. Modifications and variations of the embodiments described above will occur to those skilled in the art in the light of the above teachings. The scope of the invention is defined with reference to the following claims.

What is claimed is:

1. A display apparatus for an automotive vehicle, comprising:
   a display disposed on a position of the vehicle placed in a proximity to a dashboard surface of the vehicle; and
   a controller, in response to a detection of a state of the vehicle which satisfies a predetermined condition, to carry out a process to gradually reduce a brightness of an image screen of the display toward a predetermined direction which is more distant from a direction of a line of sight of a vehicular driver when the vehicular driver gazes a vehicular forward direction.

2. A display apparatus for an automotive vehicle as claimed in claim 1, wherein a part of the image screen of the display is disposed at an outside of a range, with a line segment directed from a position of the vehicular driver's eyes toward a center portion of the display as a center, between 20° of each of upper and lower directions with respect to the line segment and 30° of each of leftward and rightward directions with respect thereto.

3. A display apparatus for an automotive vehicle as claimed in claim 1, wherein the controller carries out the process to gradually reduce the brightness of the image screen of the display toward the predetermined direction by reducing the brightness thereof toward the predetermined direction in a linear manner.

4. A display apparatus for an automotive vehicle as claimed in claim 1, wherein the controller carries out the process to gradually reduce the brightness of the image screen of the display toward the predetermined direction by reducing the brightness thereof toward the predetermined direction in an exponential function manner.

5. A display apparatus for an automotive vehicle as claimed in claim 1, wherein the controller carries out the process to gradually reduce the brightness of the image screen of the display toward the predetermined direction by reducing the brightness at least a region of the image screen of the display in a stepwise manner.

6. A display apparatus for an automotive vehicle as claimed in claim 1, wherein the controller carries out a process to gradually increase the brightness of the image screen after a light intensity of the image screen of the display is once reduced in response to the detection of the state of the vehicle which satisfies the predetermined condition.

7. A display apparatus for an automotive vehicle as claimed in claim 6, wherein, after the light intensity of the image screen of the display is once reduced, the controller modifies a rate of the gradual increase in the brightness of the image screen of the display between a part of the image screen of the display which is relatively near to the direction of the line of sight and another part thereof which is relatively distant from the direction of the line of sight.

8. A display apparatus for an automotive vehicle as claimed in claim 6, wherein, when the controller carries out the process to gradually increase the brightness of the image screen after the light intensity of the image screen is once reduced, the controller carries out a process to remain unchanged the brightness of only a region of the display which is relatively near to the direction of the line of sight of the vehicular driver.

9. A display apparatus for an automotive vehicle as claimed in claim 6, wherein a start time at which the controller starts to carry out the process to gradually increase the brightness of the image screen after the light intensity of the image screen is once reduced is set to be made earlier as a region of the image screen of the display becomes nearer to the direction of the line of sight.

10. A display apparatus for an automotive vehicle as claimed in claim 6, wherein, when the controller carries out the process to gradually increase the brightness of the image screen after the light intensity of the image screen is once reduced, the controller carries out a process to increase the brightness of the image screen of the display in a linear manner with respect to an elapse of time.

11. A display apparatus for an automotive vehicle as claimed in claim 6, wherein, when the controller carries out the process to gradually increase the brightness of the image screen after the light intensity of the image screen is once reduced, the controller carries out a process to increase the brightness of the image screen of the display in an exponential function manner with respect to an elapse of time.

12. A display apparatus for an automotive vehicle as claimed in claim 6, wherein, when the controller carries out the process to gradually increase the brightness of the image screen after the light intensity of the image screen is once reduced, the controller carries out a process to increase the brightness of the image screen of the display in a stepwise manner with respect to an elapse of time.

13. A display apparatus for an automotive vehicle as claimed in claim 1, wherein the predetermined direction is directed from an upper end of the image screen of the display to a lower end thereof as viewed through the image screen of the display.

14. A display apparatus for an automotive vehicle as claimed in claim 1, wherein the predetermined direction is directed from a proximity to a right upper end of the image screen of the display to a left lower end thereof as viewed through the image screen of the display.

15. A display apparatus for an automotive vehicle as claimed in claim 1, wherein the predetermined direction is directed from a proximity to a left upper end of the image screen of the display to a right lower end thereof as viewed through the image screen of the display.

16. A display apparatus for an automotive vehicle as claimed in claim 1, wherein the predetermined direction is directed from a proximity to a point P on the image screen of the display to a proximity to a point Q thereon, wherein P denotes a viewing point of the vehicular driver when the vehicular driver gazes the vehicular forward direction and Q denotes a most distant point on the image screen of the display from the viewing point of the vehicular driver when the vehicular driver gazes the vehicular forward direction.

17. A display apparatus for an automotive vehicle, comprising:

image display means disposed on a position of the vehicle placed in a proximity to a dashboard surface of the vehicle; and controlling means, in response to a detection of a state of the vehicle which satisfies a predetermined condition, for gradually reducing a brightness of an image screen of the display toward a predetermined direction which is more distant from a direction of a line of sight of a vehicular driver when the vehicular driver gazes a vehicular forward direction.

18. A display method for an automotive vehicle, comprising:

providing a display disposed on a position of the vehicle placed in a proximity to a dashboard surface of the vehicle;

detecting a state of the vehicle which satisfies a predetermined condition; and gradually reducing a brightness of an image screen of the display toward a predetermined direction which is more distant from a direction of a line of sight of a vehicular driver when the vehicular driver gazes a vehicular forward direction.

* * * * *